United States Patent [19]
Carter et al.

[11] Patent Number: 5,755,254
[45] Date of Patent: May 26, 1998

[54] TWO STAGE PRESSURE REGULATOR

[75] Inventors: Stephen A. Carter, Mississauga; Michael A. Knappers, East York, both of Canada

[73] Assignee: Sherex Industries, Ltd., Burlington, Canada

[21] Appl. No.: 622,912

[22] Filed: Mar. 27, 1996

Related U.S. Application Data

[63] Continuation of Ser. No. 520,962, Aug. 30, 1995, abandoned.

[30] Foreign Application Priority Data

Aug. 30, 1994 [CA] Canada ................. 2131108

[51] Int. Cl.⁶ .................................................. G05D 16/02
[52] U.S. Cl. ................. 137/340; 137/505; 137/505.11; 137/505.12; 137/505.18; 137/505.41; 137/549
[58] Field of Search .............................. 137/340, 505.11, 137/505.12, 505.18, 505, 505.41, 549

[56] References Cited

U.S. PATENT DOCUMENTS

| | | |
|---|---|---|
| 1,264,006 | 4/1918 | Buckman . |
| 1,731,519 | 10/1929 | Bastian ......................... 137/505.12 |
| 1,842,236 | 1/1932 | Bastian . |
| 1,883,690 | 10/1932 | Gilgenberg . |
| 2,057,133 | 10/1936 | Bryce et al. . |
| 2,057,150 | 10/1936 | Kehl et al. . |
| 2,192,630 | 3/1940 | Beam ........................ 137/505.12 X |
| 2,302,284 | 11/1942 | Abbott . |
| 2,306,060 | 12/1942 | Jacobsson . |
| 2,362,352 | 11/1944 | Buttner . |
| 2,687,018 | 8/1954 | Baldwin et al. ............... 137/505 X |
| 2,696,714 | 12/1954 | Hughes ..................... 137/505.12 X |
| 2,768,643 | 10/1956 | Acomb ........................... 251/64 X |
| 2,794,321 | 6/1957 | Warner et al. . |
| 2,819,728 | 1/1958 | Gage et al. . |
| 2,824,186 | 2/1958 | Binford . |
| 3,023,093 | 2/1962 | Hughes . |
| 3,176,709 | 4/1965 | Jones . |
| 3,211,175 | 10/1965 | Replogle . |
| 3,323,535 | 6/1967 | Klemm et al. .............. 137/505.12 X |
| 3,386,458 | 6/1968 | Wasserman et al. ........ 137/505.12 X |
| 3,443,583 | 5/1969 | Webb . |
| 3,643,683 | 2/1972 | Semon ......................... 137/505.18 |
| 4,276,902 | 7/1981 | Roth . |
| 4,541,454 | 9/1985 | Sturman et al. . |
| 4,744,387 | 5/1988 | Otteman . |
| 4,898,205 | 2/1990 | Ross ............................. 137/505.12 |

FOREIGN PATENT DOCUMENTS 1326794  2/1994  Canada .

*Primary Examiner*—Stephen M. Hepperle
*Attorney, Agent, or Firm*—Matthews, Collins, Shepherd & Gould, P.A.

[57] ABSTRACT

The present invention provides an improved two-stage pressure regulators for various compressed gases, and more particularly to pressure regulators used for gaseous fuels such as compressed or liquified natural gas. The pressure regulator of the present invention is a robust, compact, high flow, low droop, low pressure drop and low creep regulator which is suitable for both OEM and aftermarket use. It can be used by itself, or with an optional third stage to provide a three stage regulator such as the atmospheric (or zero pressure differential) types commonly used to regulate the fuel pressure for gaseous carburetion systems. It is particularly useful in mono-, bi-, and dual fuel engine applications.

The two stage regulator of the present invention consists of a single base (the "regulator base") upon which are mounted all of the components of the regulator, including the first and second stage regulator spring towers, a pressure relief valve (or PRV) spring tower, a filter assembly, a high pressure solenoid-activated valve, and an optional cylinder pressure sender. Channels provided in the base, for example by machining, permit the flow of coolant or other fluid through the base to control the temperature of the pressure regulator, and thus the outlet temperature of the gas flowing through it.

20 Claims, 11 Drawing Sheets

TWO STAGE PRESSURE REGULATOR

This application is a continuation of application Ser. No. 08/520,962, filed Aug. 30, 1995, now abandoned.

FIELD OF THE INVENTION

The present invention relates to pressure regulators for various compressed gases, and more particularly to pressure regulators used for gaseous fuels such as compressed or liquified natural gas.

BACKGROUND OF THE INVENTION

It is becoming increasingly common to use so-called alternate fuels, such as propane or natural gas, in internal combustion engines. Often such engines are converted to use one of two or more sources of fuel, such as gasoline and natural gas; the operator has the ability to switch between sources depending on the availability and price of these fuels.

Almost all such vehicles are manufactured to operate on gasoline only and are converted to run on two or more fuels. The vehicles are manufactured with storage tanks for gasoline, pumps for moving the gasoline from the tank to the engine, and caburetors or fuel injectors for introducing the fuel and the required amount of air for combustion into the engine.

Gaseous fuels such as propane and natural gas must be stored in pressurized cylinders to compress the gas into a manageable volume. Increasing the pressure to the highest level that can safely be handled by the pressurized storage cylinder increases the amount of fuel that can be stored in that cylinder and extends the distance that the vehicle can be driven to its maximum. Typical storage cylinder pressures range from 2000 to 5000 psig.

Internal combustion engines cannot operate at such a high pressure, and the pressure of the gas must be reduced to a level at which the engine can be operated safely.

The pressure must also be regulated as it is reduced to ensure that the pressure of the fuel entering the engine is constant even as the pressure in the storage cylinder is reduced. At the same time, the pressure regulation must permit as much gas as possible to be removed from the storage cylinder, and thus permit the pressure in the storage cylinder to fall to as close to the operating pressure as possible. A high pressure difference across the pressure regulator means that unused fuel remains in the storage cylinder and is unavailable to the engine.

Conventional pressure regulators having one or more stages over which the pressure is reduced are well-known and have long been used to reduce the pressure and regulate the flow of compressed gases. Some of these are known as pressure-balanced regulators and use various arrangements of springs, diaphragms and machined parts to balance pressures and fluid flow over the various stages of the regulator.

For example, U.S. Pat. No. 2,794,321 issued Jun. 4, 1957 to F. J. Warner et al discloses a single stage fuel pressure regulator said to be useful in reducing and regulating the pressure of fuels such as propane for use as fuel in an internal combustion engine.

Some pressure regulators, such as those commonly used on tanks of compressed gas such as oxygen or acetylene, are designed to permit the operator to adjust the pressure drop across each stage. Others, such as those typically used in fuel supply systems, are pre-set and permit either no adjustment or only "fine tuning" by the operator, although more extensive adjustments by authorized service people can be made.

The pressure regulators of the prior art suffer from a number of disadvantages that the pressure regulator of the present invention is intended to overcome.

One of the principal problems is referred to as "droop", i.e., the degree of uncertainty about the output pressure of the regulator. This uncertainty is a function of the fuel flow rate and the pressure in the storage cylinder and creates problems because the fuel injectors commonly used on modern vehicles are intended to operate at a constant fuel pressure. Previously proposed solutions involve the use of temperature and pressure senders to detect variations in the fuel temperature and pressure, and make appropriate adjustments to the operation of the engine.

Another problem is "creep", the increase in pressure within the regulator, and downstream from the regulator, when the injector is turned off. Such an increase in pressure makes it difficult to open the injector against the higher-than-expected output pressure from the regulator.

Associated with this zero-flow-rate pressure rise is leakage of fuel from the regulator.

The flow of fuel to a pressure regulator is typically controlled by a solenoid-controlled valve that may be opened by the operator of the vehicle just before the ignition system is switched on. The solenoid controlled valve typically opens a pilot piston against the cylinder pressure which allows the downstream pressure to equalize with the upstream pressure. When the two pressures are close to equal, the primary piston opens to allow unrestricted fuel flow thro the valve. In regulator assemblies of the prior art, it may take several seconds for the desired operating pressure to be reached at the fuel injector. Unless the operator of the vehicle waits for this interval before switching on the ignition, the vehicle may not start properly, or at all.

The pressure regulator of the present invention provides an improved solenoid that opens quickly, independently of the pressure in the storage cylinder, thus allowing the regulator to reach operating pressures almost immediately.

Among the other benefits of the improved pressure regulator of the present invention are a decrease in the minimum cylinder pressure that can be reached before refueling, an improved modular design that permits mounting in a variety of positions and orientations, and an improved filter design that results in a lower pressure drop across the filter and permits the filter to be cleaned or changed more easily. The improved pressure regulator of the present invention incorporates a novel pressure relief valve that can be manufactured by inexpensive die casting or similar techniques from plastic or other inexpensive, non-corrosive material.

SUMMARY OF THE INVENTION

The present invention provides a two stage regulator to regulate the pressure of compressed gases such as natural gas used in natural gas powered vehicles. The pressure regulator of the present invention is a robust, compact, high flow, low droop, low pressure drop and low creep regulator which is suitable for both OEM and aftermarket use. It can be used by itself, or with an optional third stage to provide a three stage regulator such as the atmospheric (or zero pressure differential) types commonly used to regulate the fuel pressure for gaseous carburetion systems. It is particularly useful in mono-, bi-, and dual fuel engine applications.

The two stage regulator of the present invention consists of a single base (the "regulator base") upon which are mounted all of the components of the regulator, including the first and second stage regulator spring towers, a pressure relief valve (or PRV) spring tower, a filter assembly, a high pressure solenoid-activated valve, and an optional cylinder pressure sender. Channels provided in the base, for example by machining, permit the flow of coolant or other fluid through the base to control the temperature of the pressure regulator, and thus the outlet temperature of the gas flowing through it.

The components of the regulator have novel designs which permit the regulator to achieve the objects of the invention.

The design of the improved two-stage pressure regulator of the present invention provides a balanced design that minimizes variation in the output pressure. In the spring-diaphragm based regulators of the prior art, the output pressure is a function of a large number of variables including the input pressure to the regulator, the output flow rate, the characteristics and properties of the diaphragm, including its effective area and stretch, the reference pressure, the orifice area and shape, the pintle area and shape, the spring rate, and the operating temperature.

Balancing the components of the regulator minimizes the effect of several of these factors. Balancing the pintle eliminates the effect of input pressure, which is either the first or second largest contributor to overall droop on the transfer function determining output pressure. Thus, balancing the regulator allows a much smaller regulator to achieve any given droop level. Smaller regulators have faster response and are cheaper to make than larger regulators.

The improved design of the two-stage pressure regulator of the present invention uses counterwound springs to improve the stability and response of the regulator, and to allow the use of smaller spring towers. Regulator design involves choices to be made between conflicting items such as: size, cost, droop, flow capacity, output pressure, response time, stability, reliability, robustness and appearance.

As an example, the combination of orifice sizes, diaphragm areas, droop levels, diaphragm reference pressures, spring rates and dual counterwound springs, reduces the size of several key parts by over 70%. Those reductions improve transient response plus reduce piece cost and package size.

Each of the first stage and second stages of the regulator have been designed to minimise the mass of the dynamic components, which in turn minimizes the inertia of these components in operation and permits faster response to changes in operating conditions in the regulator. Each of the two stages utilises two counter wound springs to minimise the spring constant and the height of the spring tower required. As explained below, this is believed to lead to lower "droop", or degree of uncertainty of operating pressure. All of the dynamic first stage components, with the exception of the pintle, may be constructed of aluminium, or other lightweight materials having appropriate strength and thermal shock properties.

A rolling diaphragm (preferably, of a "top hat" type configuration described further below) is used in each of the first and second stages to maintain a constant effective area throughout the entire range of movement of the diaphragm.

The rolling diaphragm of the present invention has greater durability, and allows higher manufacturing tolerance, than a flat diaphragm, and to a large extent eliminates the hysteresis effect of flat diaphragms. A diaphragm of this configuration has an exceptionally long operating life, and good cold weather performance and durability.

In the regulator of the present invention, the first stage spring tower is sealed from the environment, and is referenced instead to the pressure in the second stage. It has been found that it is not necessary to include external pressure adjustment means in the first stage, since a ±10% variation in the 1st stage pressure will result in only a negligible variation in the outlet pressure from the regulator.

Each of the first and second stages includes a pintle assembly whose construction has been arranged to eliminate a potential leak path found in regulators of the prior art (i.e. through the interior of the pintle, diaphragm, diaphragm stop assembly and into the interior of the spring tower). Each pintle has a snap-in assembly that eliminates the risk of damage to the O-ring or other sealing means. Each of the pintles is manufactured from a material which will withstand the pressures and potential corrosive forces to which it is exposed, and which will provide an effective seal against the upstream pressures when required. The pintle of the first stage may be manufactured from a hard plastic seal material (such as Zytel) which substantially eliminates the risk of any high pressure extrusion of the pintle, which may otherwise occur with a rubber seal. The pintle cavity plug contains an O-ring at its base to eliminate boss expansion; the thread depth may be calculated to withstand pressure of more than 20,000 psi. In one embodiment of the present invention, a moulded rubber seal may be used for the second stage pintle seal, since the seal is exposed to a maximum operating pressure of only 250 psig, and high pressure extrusion of this material is not a concern. The use of a softer material in the lower pressure second stage will significantly reduce zero flow creep.

As explained in more detail below, the construction of the second stage regulator is substantially identical to the first stage, with the exception of the arrangement of the pintle seal, and the details of the spring tower construction. In the preferred embodiment of the present invention shown in FIG. 6, a moulded rubber seal is used for the second stage pintle seal, since, unlike the seal in the first stage, the seal is exposed to a maximum pressure of only 250 psig and high pressure extrusion is not a concern. This approach dramatically reduces zero flow creep, (pressure rise at rest) as it provides lower leakage than a hard plastic seal (such as the Zytel brand material used in the first stage of the preferred embodiment.). The second stage spring tower contains a pressure adjustment screw, which permits the adjustment of the pressure in the second stage, and thus the output pressure from the regulator when it is used alone, and provision for a tamper proof plug which may be installed after factory adjustment of the second stage.

Each of the spring towers of the first and second stages are mounted on the base by conventional means, such as conventional fasteners (machine screws), or threaded locking rings.

The different force imbalances (due to different input pressures to the 2 stages) result in higher droop in the first stage, but this is corrected in the second.

The pressure regulator of the present invention is provided with a pressure relief valve which is intended to operate in the event of a failure of the first regulator stage. In the event of such a failure, the pressure of the gas entering the second stage would be substantially higher than normal. To protect the second stage and other downstream components from the effects of such high pressure, a pressure relief valve is provided between the first and second stages which consists of a low mass piston, a PRV spring and a PRV tower. The valve is designed to have an annular area around the piston which is equivalent to the PRV orifice area. This allows the relief pressure to act on a larger area once a pre-determined pressure (the set point) in the PRV is reached, and the piston comes off its seat to relieve that pressure, thus forcing the piston wide open, and providing immediate pressure relief. It has been found that it is not necessary to provide any external adjustment to this predetermined pressure, since a ±5% variation in the set point is acceptable, and will provide adequate protection for the regulator.

The PRV tower is fastened to the regulator base by any conventional means, for example, machine screws, which pass through a flange on the base of the PRV tower. The valve may be made with inexpensive die casting techniques, or by conventional machining methods, from non-corroding materials, such as aluminum or brass.

The outlet from the pressure relief valve may be vented to the atmosphere, to a collection or recovery chamber.

A high pressure sender receptacle has been designed in the body to accommodate an optional high pressure sender, which may be used to measure the cylinder pressure. A pressure tap connects the port to the high pressure drilling downstream of the high pressure solenoid, in such a way that a partial restriction to the fast pressure rise which will occur when the "instant on" solenoid opens (thereby reducing the wiper and seal speed in the sender). Consequently, the high pressure sender is only pressurised when the solenoid is energised, and is not kept under pressure when the solenoid is closed. This prolongs the life of the high pressure sender. Fuel inlet temperature information may be used in conjunction with the high pressure sender to provide a temperature compensated signal for better fuel gauge accuracy.

The temperature controlling fluid passageways flow around the outside perimeter of the body and have been designed to provide heating to the regulator base and to the components mounted on it. The total combined passageway length is designed to provide sufficient heat transfer to raise the gas temperature by 100 degrees Celsius at maximum flow and cylinder pressure (about 2 kW of heat in some applications) and to compensate for the heat loss as the gas expands. The modular construction of the present invention permits the use of high pressure gas passageways significantly longer than those in regulators now in use, and provides improved heat transfer from the coolant to the pressurized gas. Surface to volume ratios and a suitable thermal conductivity of the base material may be selected to provide optimal heat transfer designs. The cross-sectional area of the thermal fluid passageways may be minimised to allow minimal diversion of coolant flow from an engine. The design of appropriate fluid passageways is believed to be within the skill of those in the art.

An outlet end temperature sensor can be installed on the top or side face in line, with the outlet passage between the 2nd stage spring tower and PRV tower. The regulator design allows the installation of either or both a fuel inlet or fuel outlet temperature sensor. The temperature sensor can be isolated from most of the heating effects of the regulator body to allow for an accurate measurement of temperature of the fuel flowing from the cylinder. This temperature sensor can be combined with the fuel pressure sender unit to provide a temperature compensated fuel gauge signal.

The two stage regulator disclosed is much more compact than regulators now in use. The inlet, the regulated outlet, the PRV outlet and the coolant inlet and outlet connections are on the front face, thus allowing the unit to be mounted using any of the four remaining faces. The inlet boss of one embodiment of the present invention has been designed for a straight thread O-ring fitting; the remaining fitting bosses have been designed for 45 degree flare fittings, thus allowing maximum fitting rotation, and maintaining the mounting options. Other fitting types could be selected and used with little or no change in the bosses.

In operation, the pressurised natural gas, which may be at a pressure of 120 psig and up to 5000 psig, enters the regulator and passes through the filter to the first stage of the regulator. It passes upward through the pintle orifice. The first stage springs act against the gas pressure to maintain the orifice in an open position, regulating the flow of the gas from the pressurized storage cylinder into the first stage of the regulator. The pressure is reduced to about 120–250 psig.

From the first stage, the gas passes through a transfer passage to the second stage. Connected to that transfer passage is a passage to the pressure relief valve, which, as noted above, is intended to open in the event of a failure of the first stage of the regulator, to protect the downstream components from the high pressure of the unregulated gas.

From the transfer passage, the natural gas flows upward through the pintle orifice in the 2nd stage of the regulator; in the second stage, the pressure is reduced to about 100 psig (or such other pressure as might be chosen and maintained by appropriate spring rate selections, generally ranging from about 50 to 150 psig.).

The first and second stage towers, pressure relief valve, fuel storage pressure sender, filter and high pressure solenoid towers are all of similar height resulting in an overall substantially rectilinear and compact configuration which facilitates the use of a modesty/environmental cover.

The two-stage pressure regulator of the present invention disclosed has several benefits over previously known regulators, arising from its novel structure. It results in lower droop or "degree of uncertainty about operating pressure". There is lower leakage when the natural gas fuel is not being used. The improved design results in lower creep or "increase in pressure above nominal" when the injectors are turned off, and there is no demand for the pressurized gas. The modular construction provides fitting flexibility and compactness, with increased mounting options.

The pressure regulator of the present invention requires a lower input pressure to operate, and can operate at a cylinder pressure as low as 100–120 psig. Thus, more of the fuel in the fuel cylinder can be used before refilling. Conventional pressure regulators operate only down to 200–250 psig cylinder pressure.

The regulator provides better transient response because of the lower droop design, and the use of lightweight components, resulting in smoother operation.

The regulator is capable of providing different outlet pressures, while maintaining low droop, by making changes to the springs or pre-set tension, in the first and/or second stage spring towers.

Finally, the regulator provides a balanced second stage for even lower droop, with consequent reduced risk of leakage.

The design of the present invention permits these components to be assembled in a relatively small and compact unit From a review of the more detailed description provided further below, it will be appreciated that the high pressure sensor design of the solenoid assembly will be useful in other applications, and may be used, for example, as:
- an in-line natural gas shut off solenoid;
- an in-cylinder shut off solenoid;
- an in-line cylinder filling system shut off solenoid when added to features including, filtration, pressure and temperature sensing, pressure relief valve, incoming and outgoing gas fittings, manual bypass and with a manifold vent;

a natural gas vehicle refuelling station dispenser mounted automatic valve;

an Emergency Shut Down automatic valve in natural gas vehicle refueling stations;

an inter-stage automatic valve on natural gas refuelling station compressors, and a fill point shut off solenoid in combination with the fuelling receptacle.

DESCRIPTION OF THE PREFERRED EMBODIMENT

Figure 1:
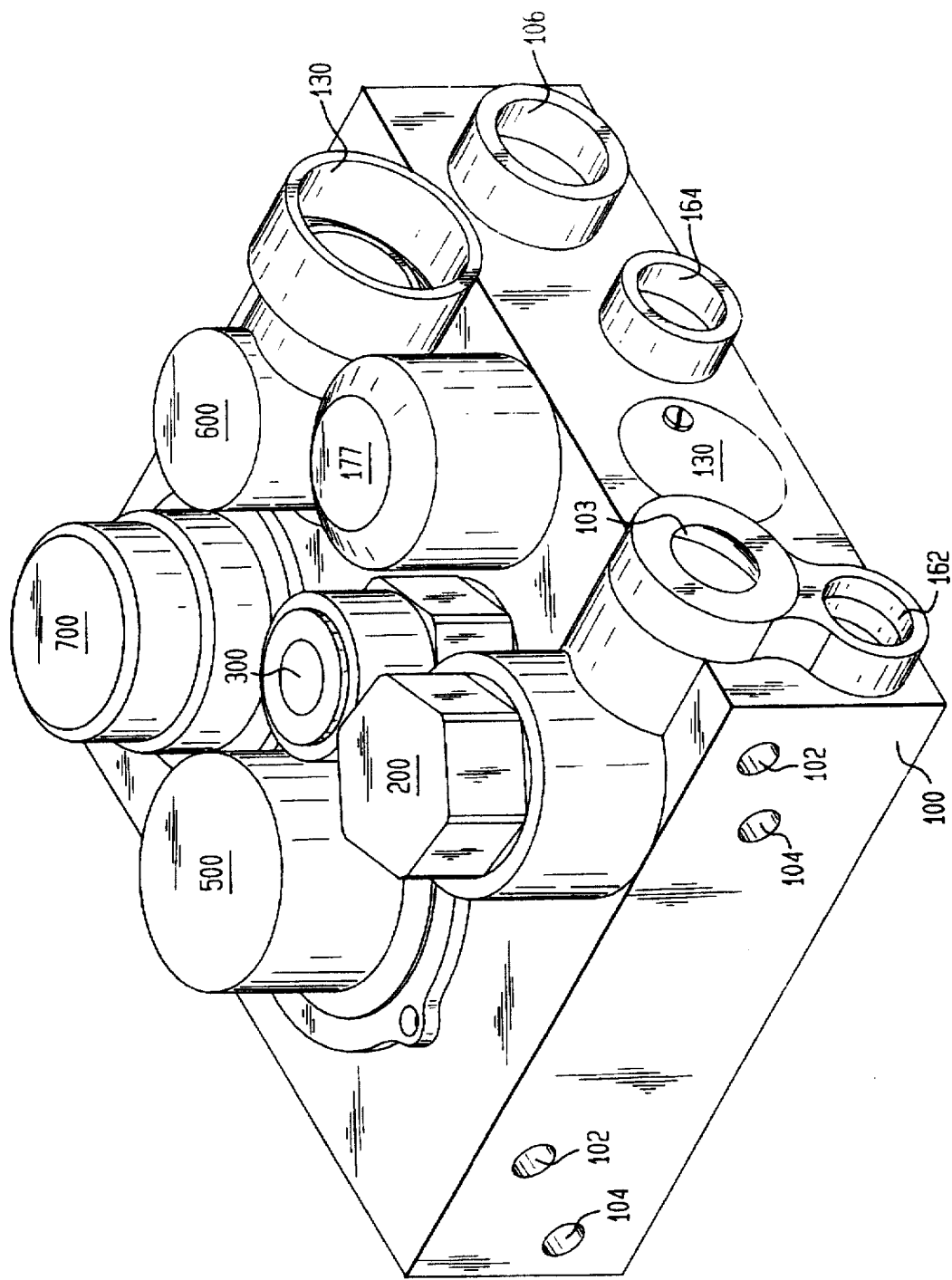
FIG. 1 is a perspective view of a pressure regulator in accordance with the preferred embodiment of the present invention, showing the top, front and one side of the regulator.
Figure 2:
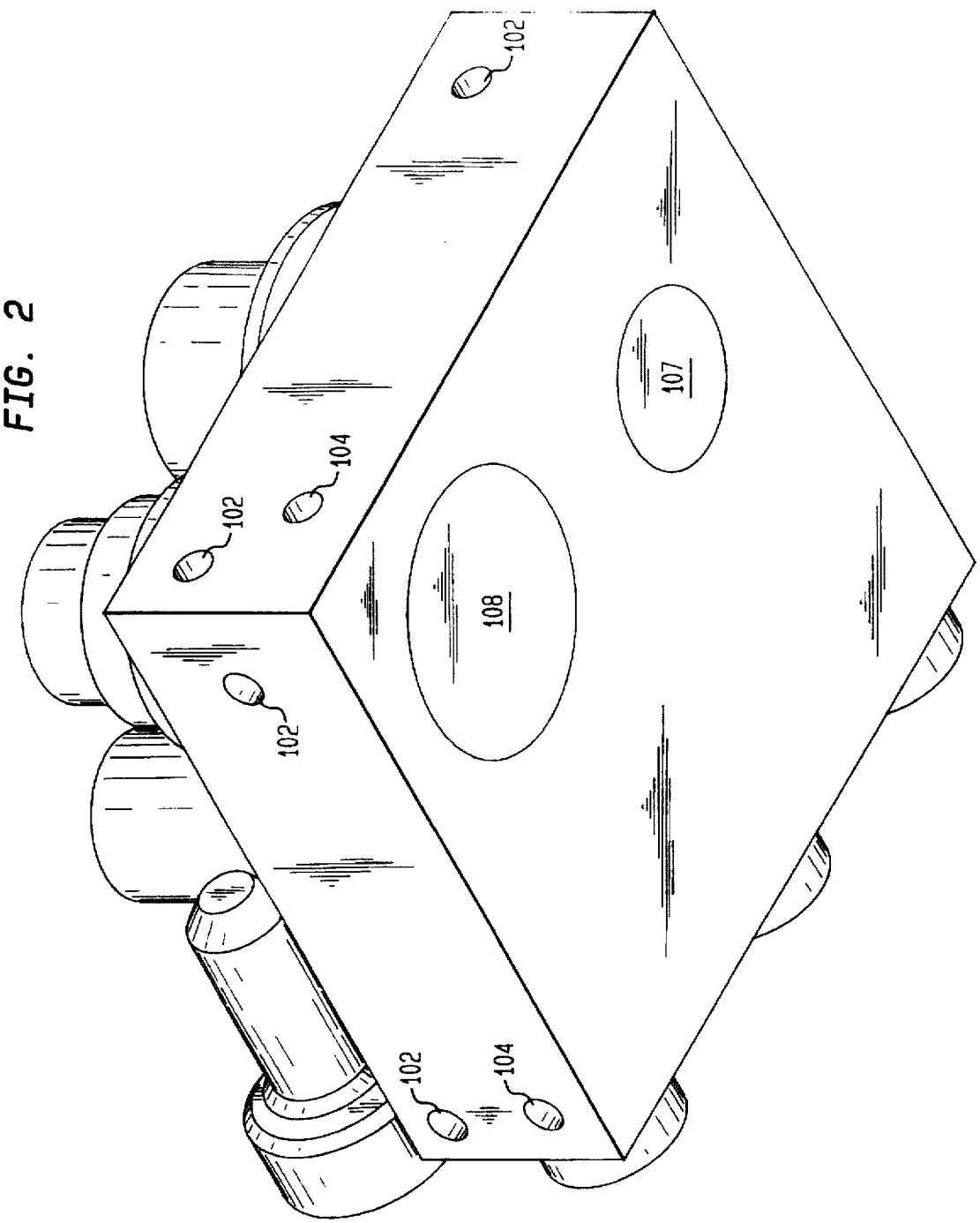
FIG. 2 is a perspective view of a pressure regulator in accordance with the preferred embodiment of the present invention, showing the bottom, rear and one side of the regulator.

Referring to FIGS. 1 and 2, the present invention, in its preferred embodiment, comprises a 2 stage regulator consisting of a base or housing 100 in which are formed, by drilling or otherwise, a number of ports and channels, described in more detail below. In the body of the housing 100 are plurality of mounting holes 102 positioned on up to 4 of the faces on the base thereby providing greater flexibility in selecting how the assembly may be installed in a desired application. A plurality of plugs 104 are also provided to close the apertures formed by drilling the natural gas communications ports or production test sites, as well as the channels for communicating temperature control fluid within the housing. On the housing is a filter assembly 200, a first stage regulator tower 500, an instant on solenoid assembly 300, a second stage regulator tower 700, a pressure relief valve ("PRV") assembly 600, and a cylinder pressure sensor assembly 400.

In the housing are apertures 162 for the entry of temperature controlling fluid, and 164 for the exit of temperature control fluid, and apertures 103 and 106 for the entry and exit of, respectively, natural gas or other fluid whose pressure is desired to regulated.

FIG. 2 shows a different perspective view of the two stage regulator assembly of the present invention, showing the bottom and rear surfaces of the base, and the location of the cavities formed therein for the first and second stages of the regulator assembly. The first stage cavity plug 107 and the second stage cavity plug 108 are shown installed in the base to seal the apertures formed during drilling of portions of the two pressure chambers.

Figure 3:
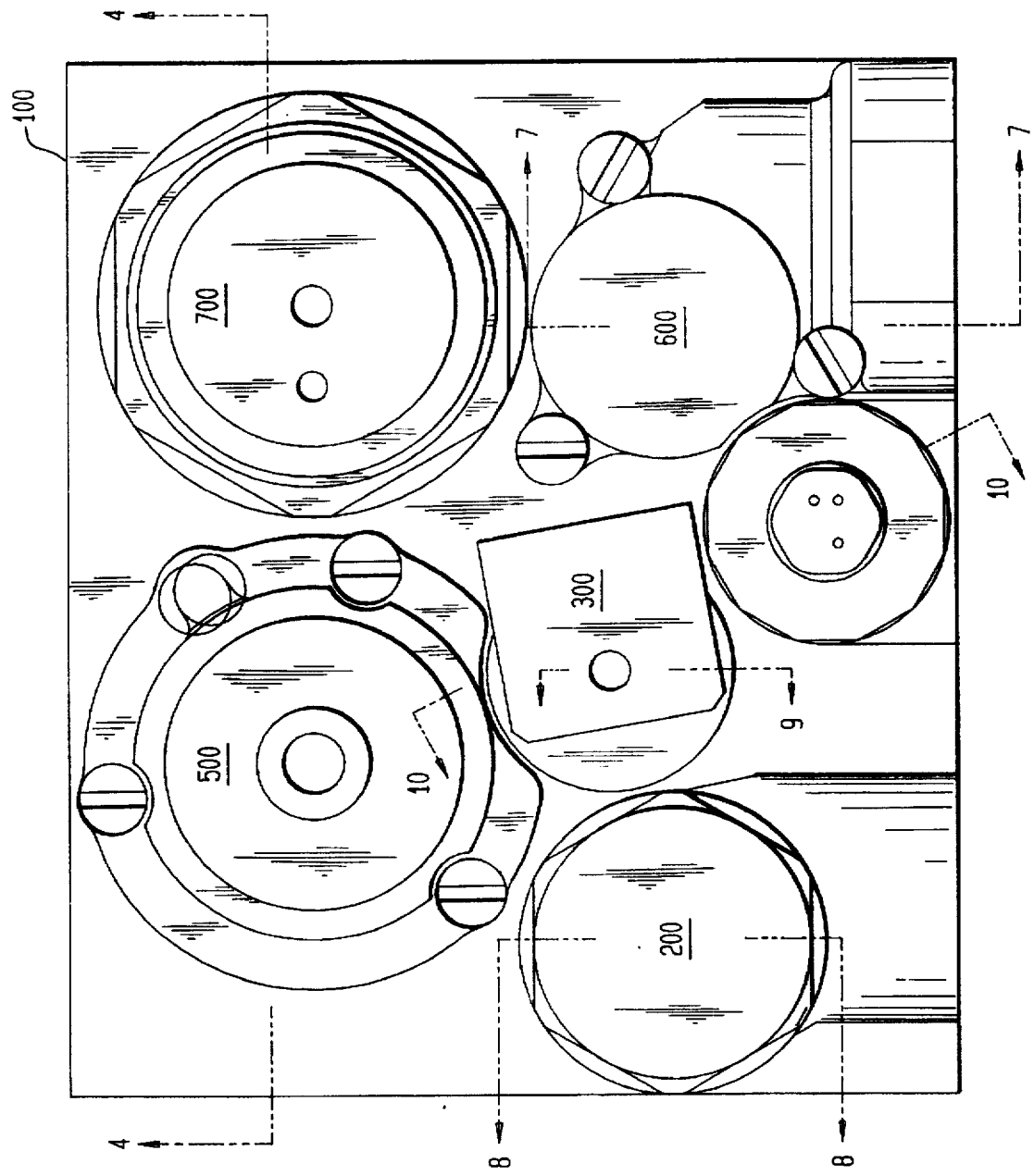
FIG. 3 is a top plan view of a pressure regulator in accordance with the preferred embodiment of the present invention.
Figure 4:
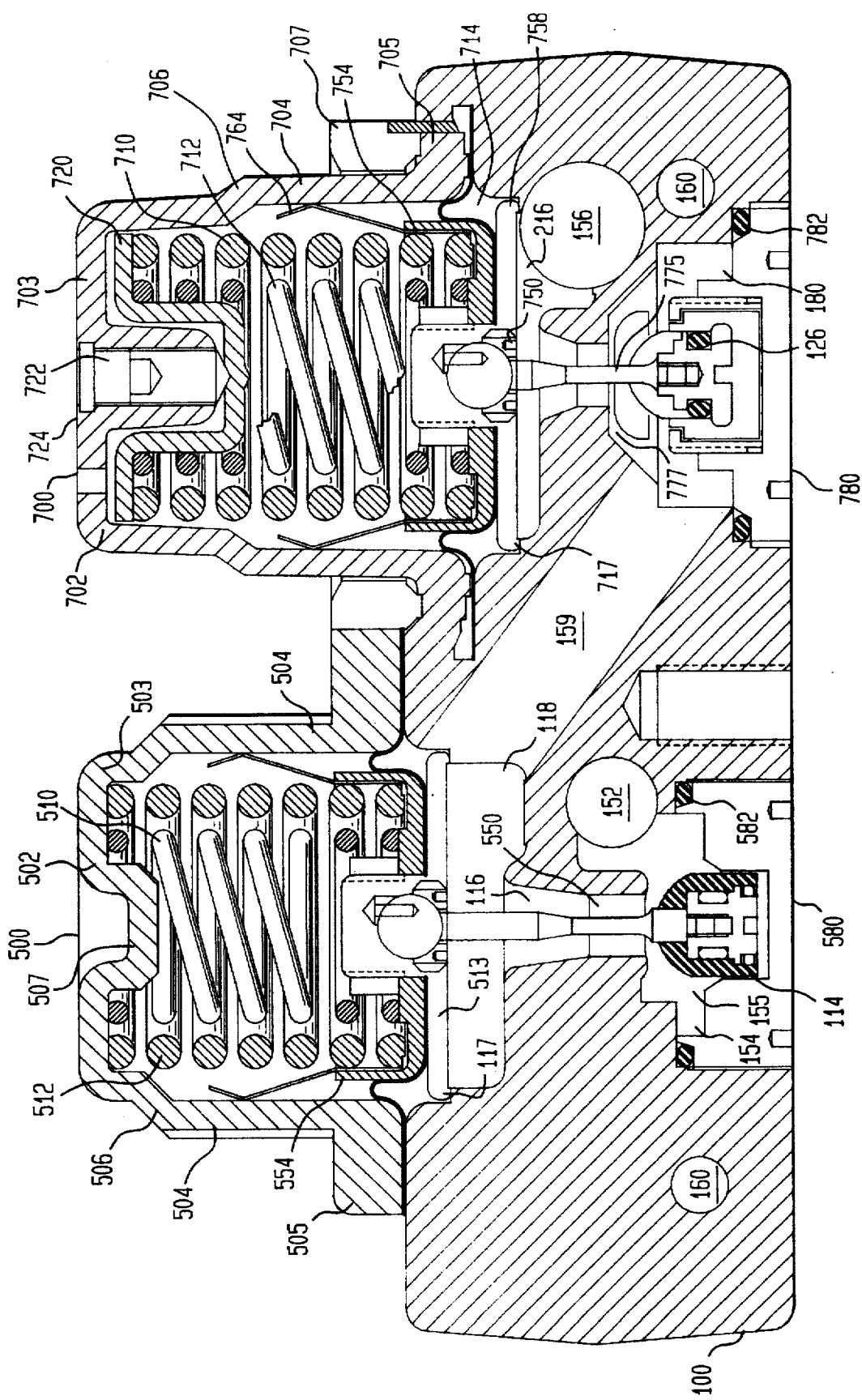
FIG. 4 is a vertical cross-section of the pressure regulator of FIG. 3, taken along the line 4—4 in FIG. 3, showing the first and second stages of the regulator in a sectional view.

FIG. 3 shows a top plan view of the pressure regulator of the present invention, including the filter assembly 200, the instant on solenoid valve assembly 300, the optional cylinder pressure sensor assembly 400, the first stage regulator tower 500, the pressure relief valve assembly 600, and the second stage regulator tower 700. Referring to FIG. 4, a cross section of the pressure regulator of FIG. 3 taken along line 4—4 of that figure, may be seen. FIG. 4 illustrates the internal structure and mechanism of the first and second stages of the two stage regulator, specifically illustrating the first and second stage spring towers, the first and second stage pintle assemblies, which are described in more detail below, and the passages through which the temperature control fluid and the regulated gas flow.

As shown in FIG. 4, the first stage spring tower 500 comprises a spring tower cover 502, having an upper wall 503, side walls 504, and a lower flange 505. Between the upper wall 503 and the side walls 504 is a shoulder 506, and on the lower side of the top wall 503 is a boss 507 adapted to receive the spring 510, as described below. As described in more detail below, the bore of the spring tower is larger than the first stage output chamber 116, thus forming a ledge 117 to prevent the diaphragm piston 554 from shearing the diaphragm if the pintle fails.

Within the first stage spring tower are springs 510 and 512, the spring 512 being disposed outside the spring 510, and the springs being wound in opposite directions. The spring constants are selected to give the desired outlet pressures. Springs with different spring constants may accommodate different outlet pressures. The boss 507 is of such a dimension that it fits within the internal diameter of the first helical spring 510, and the shoulder 506 is adapted to receive and retain the outer helical spring 512.

The spring tower cover 502 is adapted to be mounted on the base 100 by means of mounting bolts or other fastening mechanisms, not shown. For example, tamper proof screws or other means may be used to secure the flange 505 to the regulator assembly base 100.

Referring to FIG. 4, there is shown a second stage spring tower 700, consisting of a spring tower cover 702, which has an upper surface 703, side walls 704 and a lower flange 705. Between the side walls 704, and the upper surface 703 is a shoulder 706. The pressure within the second stage tower is referenced to the atmosphere by a port or opening in the cover 702, or in some other convenient location.

Figure 6:
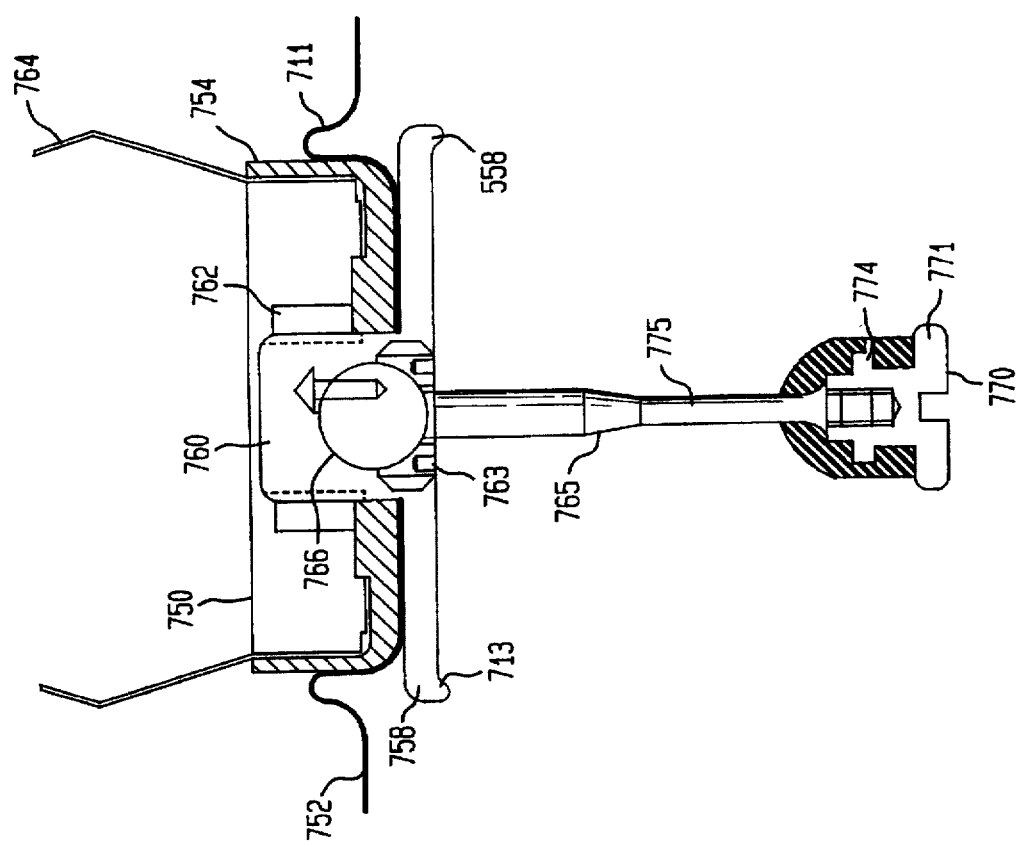
FIG. 6 is a partial sectional view of the pintle assembly of the second stage of the pressure regulator shown in FIG. 4.

Within the second stage spring of the pressure regulator is a second stage pintle arrangement, shown in more detail in FIG. 6. A locking ring 707 is provided to secure the second spring tower assembly to the base.

Included within the second spring tower assembly are first and second helical springs 710 and 712 respectively, which are wound in opposite directions. The upper ends of the springs 710 and 712 buff against a spring adjusting end cap 720, which can be displaced in a vertical direction by means of an adjusting set screw 722, thus permitting an adjustment of the force exerted by the springs 710 and 712 against the pintle assembly 750. The adjusting set screw is protected against unauthorized adjustment by tamper proofing 724, using any of several known tamper-proofing means. The bore of this spring tower is also larger than the bore of the corresponding output chamber to prevent the diaphragm piston from shearing the diaphragm if the pintle fails.

The first and second stage tower assemblies each utilize two counter wound springs to minimize tower height and the spring constant. By minimizing spring rates for a given spring tower height, this spring configuration leads to a lower degree of uncertainty of operating pressure ("droop"). Counter winding of the springs minimizes the risk of the coils of the adjacent springs becoming interlocked during movement of the springs.

Figure 5:
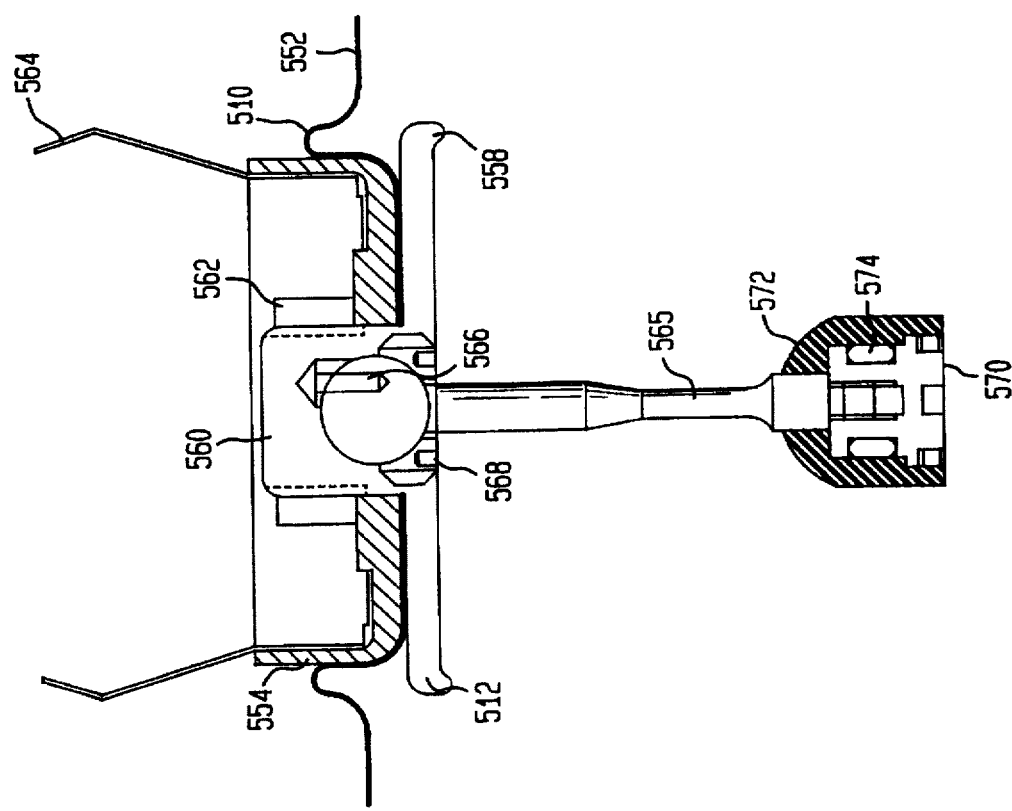
FIG. 5 is a partial sectional view of the pintle assembly of the first stage of the pressure regulator shown in FIG. 4.

Referring to FIG. 5, the first stage pintle arrangement consists of a diaphragm 552 generally disposed in a horizontal direction, but having a rolling convolution 510 extending upwardly from the diaphragm 552 to provide a modification in the behaviour of the diaphragm. Specifically, this design assures that the diaphragm is always in tension (i.e. never in shear or compression). Thus, as the convolution rolls the diaphragm is never stretched or buckled (i.e. largely eliminating hysteresis). Furthermore, this diaphragm configuration provides essentially constant working area regardless of the diaphragm, stroke, that is, the displacement of the diaphragm from its datum position.

As mentioned above, the presence of the rolling convolution provides a number of advantages, including increased longevity in the working life of the diaphragm, and allows for greater tolerances in manufacturing the diaphragm. The rolling convolution also eliminates the hysteresis effect otherwise found in a flat diaphragm during operational displacement of the diaphragm. In yet another preferred embodiment, a "top hat" style diaphragm (not shown) with a longer convolution may be used in place of a diaphragm with a pre-formed convolution. This may be used to minimize the variation in the diaphragm area which may otherwise occur with changes in position of the pintle assemblies.

The diaphragm 552 is mounted on a lower diaphragm stop 558, which has a downwardly turned outer edge 512, and central boss 560 extending through the center of the diaphragm 552. The diaphragm is retained on the lower diaphragm stop by means of a diaphragm piston 554, and a locking ring 562. A spring damper 564 is retained between the locking ring 562 and the upwardly extending outer circumference of the diaphragm piston 554. The spring damper 564 bears against the side walls 504 (shown in FIG. 4) of the spring tower but can travel along the walls during movement of the first stage pintle assembly, and serves to minimize oscillation of the spring assemblies during fluid pressure fluctuations.

In one version of the preferred embodiment, the spring damper comprises eight upwardly extending fingers each bearing against the side walls 504 (shown in FIG. 4). A damper having eight fingers will in many instances provide a better distribution of force over the side walls than will, for example, a damper having only four fingers, thus resulting in a reduced tendency of the fingers to dig into the side walls.

Mounted within the central boss of the lower diaphragm stop is a pintle stem 565, which may have a narrowed central portion, and a head 566 which is retained in place in the boss 560 by a pintle retainer 568. At the lower end of the first stage pintle arrangement is a valve pintle 570, threadedly engaged on the pintle stem 565. About the valve pintle is a valve pintle seal 572, which is kept in a sealed arrangement with valve pintle 570 by means of an O-ring 574. If desired, a Teflon washer (not shown) can be added between the diaphragm 552 and the diaphragm piston 554 to provide enhanced protection during cold weather. The Teflon washer will slow down the heat transfer to the diaphragm 552. Alternatively, the diaphragm piston 554 and the lower diaphragm stop 558 could be provided with a ceramic coating to provide such enhanced cold weather performance. Furthermore, the configuration of the spring tower chamber (shown in FIG. 4 at 513) can be altered to provide a "dead gas" trap (not shown) between diaphragm 552 and lower stop 558 to enhance cold weather performance.

Referring now to FIG. 6, the second stage pintle arrangement in many respects is similar to the first stage pintle assembly. The second stage pintle assembly consists of a diaphragm 752 generally disposed in a horizontal direction, but having a rolling convolution 711 extending upwardly from the diaphragm 752 to provide a modification in the behaviour of the diaphragm.

The diaphragm 752 is mounted on a lower diaphragm stop 758, which has a downwardly turned outer edge 713, and central boss 760 extending through the center of the diaphragm 752. The diaphragm is retained on the lower diaphragm stop by means of a diaphragm piston 754, and a locking ring 762. A spring damper 764 is retained between the locking ring 762 and the upwardly extending outer circumference of the upper diaphragm piston 754. The spring damper 764 bears against the side walls 704 of the spring tower (shown in FIG. 4) but can travel along the walls during movement of the second stage pintle assembly.

Mounted within the central boss of the lower diaphragm stop is a pintle stem 765, which may have a narrowed central portion, and a head 766 which is retained in place in the boss 760 by a pintle retainer 763. At the lower end of the first stage pintle arrangement is a valve pintle 770, threadedly engaged on the pintle stem 765. About the valve pintle is a moulded rubber seal 774. The significantly lower fluid pressures in the second stage pressure chamber permit the use of a moulded rubber seal with little risk of deformation of the seal which might otherwise occur in the presence of higher fluid pressures more commonly encountered in the first stage pressure chamber. If desired, a Teflon washer can be added between the diaphragm 752 and the diaphragm piston 754 to provide enhanced protection during cold weather. The Teflon washer will slow down the heat transfer to the diaphragm 752. Alternatively, the diaphragm piston 754 and the lower diaphragm stop 758 could be ceramic coated to provide such enhanced cold weather performance. Furthermore, the configuration of the spring tower chamber (at 714) can be altered to provide a "dead gas" trap between diaphragm 752 and lower stop 758 to enhance cold weather performance.

As mentioned above, the first and second stage pintle assemblies are somewhat similar. Some components may be interchangeable to minimize the manufacturing, storage and other costs associated with the use of different parts. For example, in the preferred embodiment, diaphragms 552 and 752, diaphragm pistons 554 and 754, diaphragm stops 558 and 758, locking rings 562 and 762, spring dampers 564 and 764, and pintle retainers 568 and 763 have the same specifications and are otherwise interchangeable for use in either the first or second stage pintle assemblies.

Referring again to FIG. 4, the fluid under pressure enters the housing through the inlet 103, shown in FIG. 1, and passes through the filter assembly described in more detail below. The fluid enters the first stage of the pressure regulator through the inlet port 152, to the first stage pintle chamber 154, which is essentially at the pressure of the gas storage cylinder. The fluid passes in a controlled manner through the gap between the pintle seal 572 and the pintle chamber walls 114, and then through the first stage pressure recovery section 112.

The flow of the fluid is regulated by the combined force exerted by the springs 510 and 512 and the diaphragm 552 (shown in FIG. 5) which tend to move the pintle assembly towards an open position, whereas the pressure of the fluid in the pintle chamber 154 acting against diaphragm 552 (shown in FIG. 5) tends to move the pintle to a closed position. Pintle chamber 154 has an integral downwardly projecting baffle 155 to prevent excessive swirling of gases flowing through the chamber. The baffle reduces the pressure drop in gases flowing through the chamber thereby permitting operation of the regulator at lower supply pressures. The diaphragm 552 (shown in FIG. 5) provides a seal against the escape of the gas up through the first stage tower, and permits a smooth vertical movement of the pintle between the closed and fully opened positions.

A ledge 117 is provided along the circumference of the first stage output chamber 116 to butt against the downwardly curved edge of the lower diaphragm stop to prevent opening of the first stage valve assembly beyond a selected distance. To further improve high flow characteristics, the first stage outlet chamber includes a dip 118 to create a smoother transition between the outlet chamber and the channel communicating with the second stage.

The lower diaphragm stop 558, as shown in FIG. 5, defines the top wall of the first stage output chamber 116. The first stage regulated fluid passes through the first stage pressure recovery section 112 to the first stage output chamber 116. The fluid then passes through the first stage to second stage transfer passage 159, to the second stage pintle chamber 180. Again, the fluid passes through the space available between the second stage pintle seal, a moulded rubber seal 774, and the second stage shoulders 126 formed as an integral part of the base.

In one embodiment, the radius of curvature of the shoulder 777 in the moulded rubber seal 774 (shown in FIG. 6), is selected to complement the radius of curvature in the shoulders 126. Complementary radii may be used as one means of substantially increasing the discharge factor of flowing gases by reducing turbulence and pressure drop in those gases. The curvature of the fillet 775 in the pintle stem 765 may be blended with the curvature of the moulded rubber seal 774 to yet further lower the tendency for pressure drop in this zone.

The flow of the fluid through the second stage chamber is regulated by the combined force exerted by the springs 710 and 712 and the diaphragm 752 (shown in FIG. 6) which tend to move the second stage pintle assembly towards an open position. The pressure of the fluid in the pintle chamber 180 acting against the diaphragm 752 (shown in FIG. 6) provides an opposing force which tends to move the second stage pintle to a closed position. The diaphragm 752 provides a seal against the escape of the fluid up through the second stage tower, and permits a smooth vertical movement of the second stage pintle between the closed and fully opened positions. The lower diaphragm stop 758, as shown in FIG. 6, defines the top wall of the upper portion 216 of the second stage output chamber.

A ledge 717 is provided in the output chamber 216 to engage outer edge 713 of the lower diaphragm stop 758 and thereby prevent displacement of the second stage pintle assembly beyond a set point. The second stage output chamber incorporates a spiral ramp (not shown) to further reduce droop. The ramp generates higher gas velocities and a smoother transition to the outlet. The ramp may be incorporated into the base by using forging techniques which are typically less costly than machining. The regulated fluid then passes through the output passage 156 which communicates with the outlet port 106, shown in FIG. 1

A removable end cap 580 is provided to enclose the lower portion of the first stage pintle chamber 154. The end cap 580 may be removed to gain access to the first stage pintle chamber for assembly, maintenance, or inspection of interior working parts. The end cap 580 also provides centering for the pintle. An O-ring 582 is seated intermediate of the regulator base 100 and the end cap 580 to provide a seal against leakage of fluid past the end cap 580. Similarly, a removable end cap 780 is provided to enclose the lower portion of the second stage pintle chamber 180. A corresponding O-ring 782 is provided to form a seal between the regulator base 100 and the second stage end cap 780.

Figure 4A:
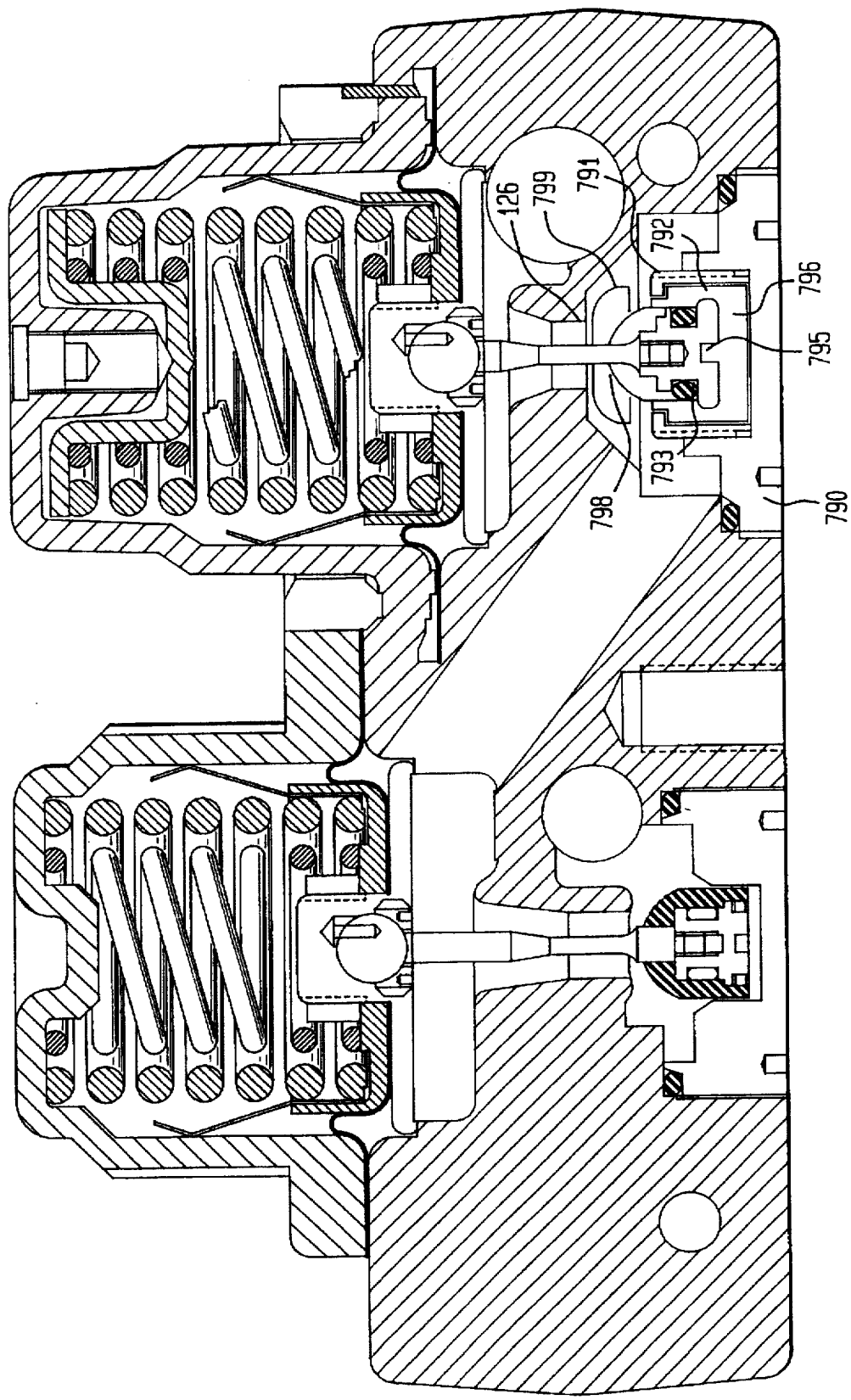
FIG. 4A is a vertical cross-section of another preferred embodiment of the present invention having a pressure balanced second stage configuration.

FIG. 4A shows yet another preferred embodiment of the present invention comprising modifications to the second stage pintle chamber, second stage pintle, and related elements. In particular, a pressure balanced pintle arrangement is disclosed as an alternative means of minimizing droop in the regulator. By using a balanced pressure configuration, it is possible to eliminate the use of complementary radii in the configuration of the pintle and the corresponding orifice defined by the shoulder 126. Furthermore, the need for spring dampers will be eliminated in many cases due to the damping characteristics of the present embodiment.

With reference to FIG. 4A, a second stage pintle 770 has a rubber seal 799 secured on its face proximate to the orifice defined by shoulders 126. The lower portion of the pintle defines a channel to retain an O-ring seal 793. The seal 793 is engaged with a cup shaped floating seal member 792 to form a substantially gas tight fit. The pintle can slide vertically with relative freedom within the housing formed by floating seal 792. Floating seal 792 is restrained against any substantial vertical displacement by means of a flanged retainer 791. However, a relatively small vertical clearance is provided between flanged retainer 791 and the floating seal 792 to permit sliding lateral movement of seal 792 relative to the end cap and retainer. It can be understood that the present configuration may be manufactured using lower cost techniques having higher tolerances.

The flanged retainer 791 may be secured to the end cap 790 by threaded or other suitable means. The lower portion of the pintle 770, the floating seal 792, and the O-ring seal 793 define a chamber 796 which communicates with the second stage pintle chamber by means of a channel or bore 795. The bore 795 has an inlet 798 to the second pintle chamber. The inlet 798 is defined by the rubber seal 799. It can be seen that pressure differences between the gas reservoir 796 and the second pintle chamber will counteract to a certain extent the force exerted by the spring assembly. That is, under a reduced pressure condition in the second pintle chamber, with a higher pressure condition in the reservoir 796, the springs will tend to open the pintle further, thereby causing gas from the reservoir 796 to exhaust into the pintle chamber via the channel 795. At the same time, the counteracting pressure of the gas remaining in the reservoir 796 will act to dampen the force exerted by the springs when they act to move the pintle further toward the open position. In circumstances in which the pressure in the pintle chamber is higher than in reservoir 796, and with the tendency of the high pressure gas in the pintle chamber to move the pintle toward the closed position, the lower relative pressure within the reservoir will to a certain extent counteract that force and reduce the tendency of the pintle to move toward the closed position.

Figure 7:
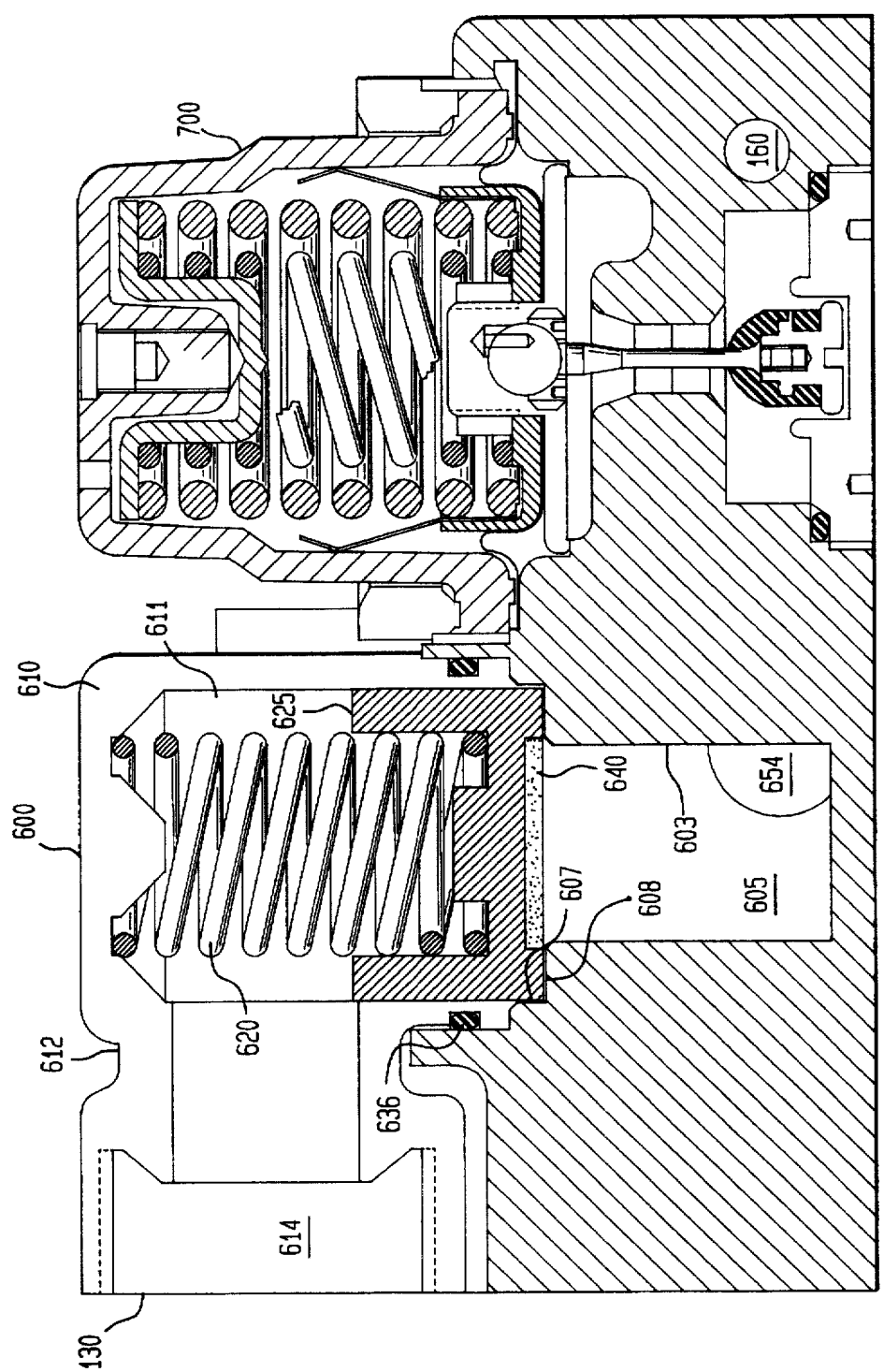
FIG. 7 is a vertical cross-section of the pressure regulator of FIG. 3, taken along the line 7—7 in FIG. 3, showing the second stage and pressure relief valve assembly of the regulator of the preferred embodiment of the present invention.

FIG. 7 shows the second stage regulator tower assembly 700 and the pressure relief valve assembly 600 of the preferred embodiment of the present invention. The PRV assembly is mounted above the PRV chamber 603 in the base 100 (shown in FIG. 1) of the pressure regulator. The PRV chamber 603 formed in the regulator base 100 (shown in FIG. 1) has a lower portion 605 connected by passage 654 to the upper portion of the first stage cavity 116 (shown in FIG. 4). The upper portion 607 is of a larger cross-section than the lower portion 605, forming a shelf 608 upon which the PRV piston 625 is retained.

The PRV assembly consists of a housing 610 connecting at its lower end with the PRV chamber 605. The housing defines an outlet cavity 611, a narrowed exit throat 612 and a widened opening 614 through which any vented gasses may pass to the atmosphere through the PRV outlet port 130. The housing 610 has a flanged base 616 in which is seated a gasket 636. The gasket 636 provides a gas tight seal between the PRV housing 610 and the regulator base 100 (shown in FIG. 1).

Within the PRV assembly is a helical spring 620 disposed between the upper end of the housing 610 and a PRV piston 625. Mounted on the lower side of the PRV piston 625 is a seal 640 which is adapted to maintain a pressure tight seal over the PRV chamber 605 under normal operating conditions. The characteristics of the spring 620 should be selected to provide the desired pressure release setting to exhaust over pressurized fluid from the assembly in order to protect the second stage components of the regulator assembly from damage. It is understood that over pressurized fluid will cause the PRV piston to be displaced upwardly by acting against the force of the spring and compressing the spring to permit the over pressurized fluid to escape into the outlet cavity 611 and then out through the outlet port 130. Once the pressure in the chamber 605 drops below that of the force exerted by the spring 620, the PRV will reseat, again providing a pressure tight seal.

Figure 7A:
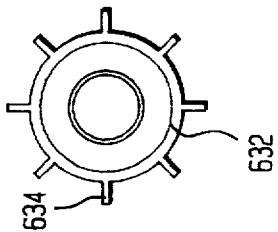
FIG. 7A is a horizontal partial section of the pressure regulator piston shown in FIG. 7, taken along the line 7A—7A.

As shown in FIGS. 7 and 7A, the PRV piston 625 consists of a central, hollow cylindrical portion 632 adapted to receive and engage the lower end of the helical spring 620. The PRV piston is preferably made of a light weight corrosion resistant material (for example, plastic). Disposed about the central cylindrical portion 632 are a plurality of fins 634 which slidably engage the walls of the upper section 607 of the PRV chamber 603. The fins are provided to promote sliding movement of the piston along the upper section walls and minimize the risk of the piston becoming seized against the walls.

Figure 8:
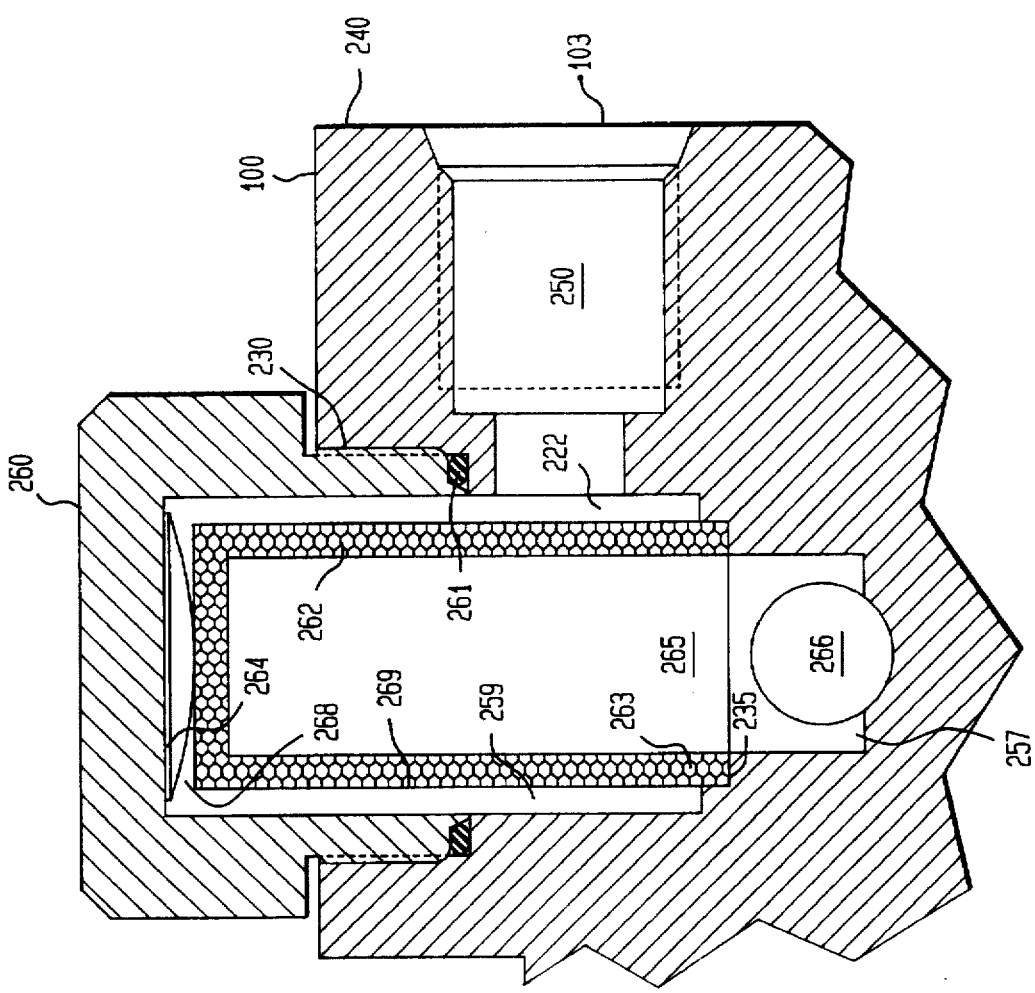
FIG. 8 is a partial sectional view of the NGV input filter area, taken along section lines 8—8 in FIG. 3, showing the filter assembly of the preferred embodiment of the present invention.

FIG. 8 shows a partial section of the NGV input filter area of the regulator assembly. A filter cap 260 is positioned in the upper filter recess 230 formed in the regulator base 100. An O-ring 261 is provided to form a seal between the abutting surfaces of the filter cap and the base 100 to minimize boss expansion. A wave washer 264 bears on the filter cap 260 and exerts a downward force on inlet filter 262. The filter cap 260 may be easily removed and subsequently resecured to facilitate replacement of a clogged inlet filter without requiring disconnection of the inlet fitting. The inlet filter 262 is of generally hollow cylindrical construction. The effective surface area of the filter element is greater than those of conventional filters. The effective surface area is made up of a substantial portion of the end face 268 of the filter (which is not covered by the wave washer 264) and substantially all of the circumferential area of the outer filter wall 269. A greater filter surface area permits higher fluid flow rates with significantly lower pressure drop across the filter. A greater filter area also reduces the chances of filter clogging and the resultant frequency of filter changes. In the preferred embodiment, the inlet filter 262 is rated at 40 microns and is made from either sintered stainless steel, sintered bronze, or sintered brass material. The lower end 263 of the inlet filter 262 is snugly seated in a recess 235 formed in the regulator base 100.

An NGV input boss 240 is provided in the base 100. The boss 240 contains the NGV input port 103 which communicates with an input channel 250. The input channel 250 communicates with an outer filter chamber 222 found intermediate of an outer wall defined by the filter cap 260 and a recess 259 formed within the regulator base 100 and the outer porous wall 269 of the inlet filter 262. A recess 257 formed in the base 100 together with the inner surface of the inlet filter 262 define an inner filter chamber 265. The outer filter chamber 222 communicates with the inner filter chamber 265 through the microscopic passageways of the inlet filter.

From the foregoing description, it can be seen that incoming fluid flows through the NGV inlet port 103 and through input channel 250. The fluid enters the outer chamber 222 which surrounds the outer wall 269 of the inlet filter. Impurities are retained on the outer surface of the inlet filter and are thus removed from the fluid. The filtered fluid passes into the inner filter chamber 265 and thereafter flows through a connecting passageway 266 to the high pressure solenoid chamber and on to the first stage regulator assembly.

Figure 9:
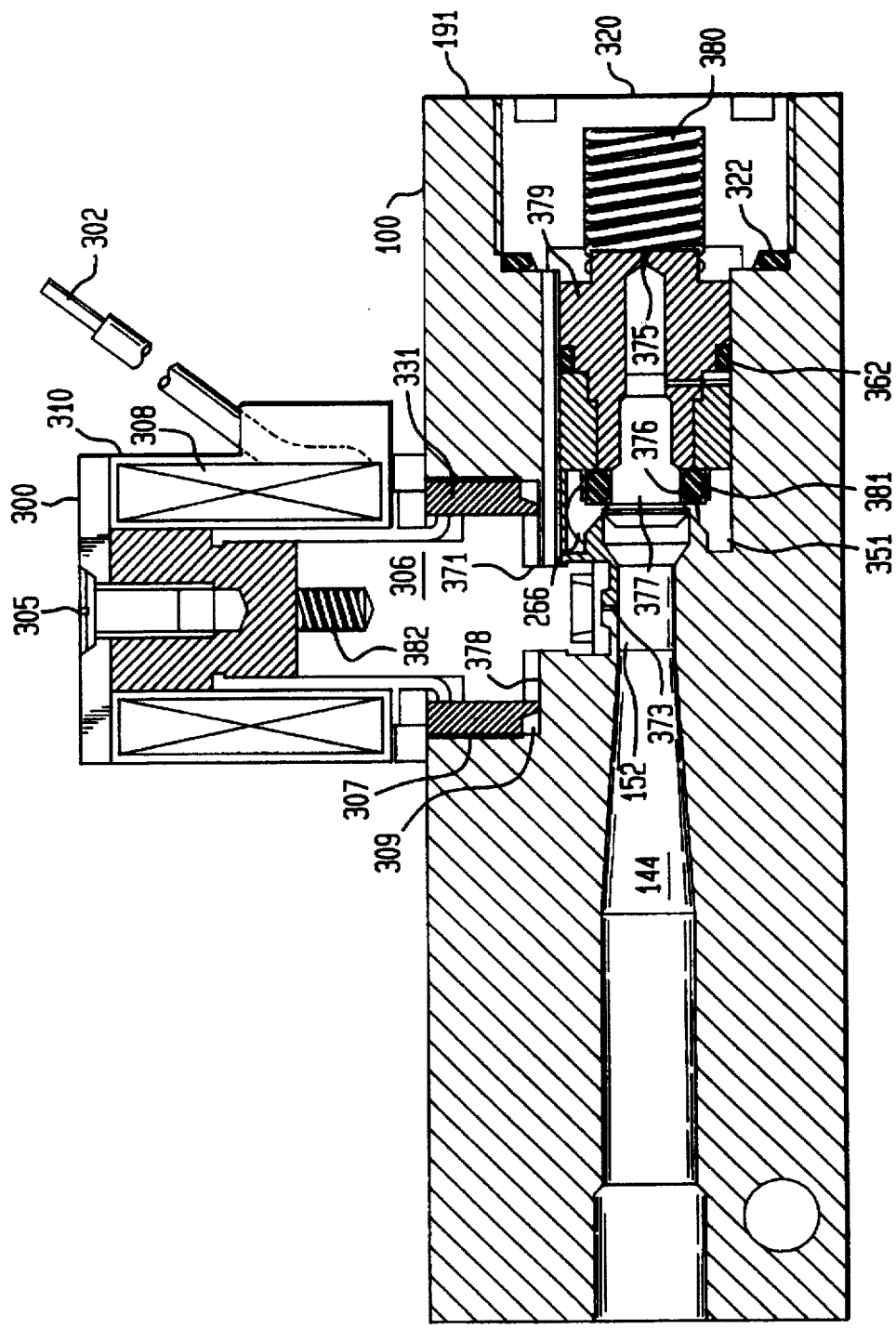
FIG. 9 is a partial sectional view of the high pressure solenoid of the preferred embodiment of the present invention, taken along section lines 9—9 shown in FIG. 3.

FIG. 9 shows a high pressure solenoid assembly 300 mounted on the regulator base 100. The solenoid assembly may be detachably secured to the regulator base by means of screws or a threaded fifting for removal and replacement, when desired. The solenoid assembly consists of a housing 310 supported on a solenoid base 331. The solenoid base 331 is housed in a pilot piston cavity 307 of the regulator base 100. An O-ring 309 is provided to seal the connection joint between the solenoid assembly and the regulator base 100. The solenoid housing contains a coil 308 connected to a power supply 302, and held to the housing 310 by means of a retaining screw 305. The coil 308 is of relatively small construction providing a compact design adapted for use in high fluid pressure applications. As this design requires relatively low amounts of magnetic force to be developed, the coil is physically smaller (less expensive, lighter weight, easier to package) than with other historic designs and requires less electrical power to operate the solenoid (resulting in higher efficiency, lower heat generation). The solenoid coil extends above and outside of the regulator base 100. The pilot piston 306 extends upwardly from within the solenoid base 331 up into the cavity surrounded by the solenoid coil 308.

A primary piston cavity end plug 320 is secured to the regulator base 100 by threaded engagement means. An O-ring 322 provides a leak proof seal between the end plug 320 and the regulator base 100. The primary piston cavity 351 is defined by the regulator housing 100 and end plug 320. The primary piston cavity 351 houses the primary piston 379 used to turn off and on the flow of fluid into the first stage of the regulator assembly as described in further detail below.

Fluid flows from the filter assembly through passageway 266 which communicates with the primary piston cavity 351 when the primary piston is in the 'on' position and thus permitting fluid to flow along connecting channel 152 to the first stage pintle chamber.

In the preferred embodiment, the instant on solenoid includes a solenoid operated pilot piston 306 which seals against a small pilot orifice 373 and a primary piston 379 which seals the main flow orifice 376. The primary piston 379 contains a low friction (Teflon type) sealing ring 362 which seals the piston in the bore while allowing movement and provides coulomb damping of any primary piston oscillations. A small bleed port 375 (smaller in diameter than the pilot orifice) is incorporated in the primary piston which allows a controlled leak rate across the piston. In addition, the primary piston contains a tapered head seal retaining screw 377 which fits closely into the primary orifice. The retaining screw prevents extrusion of the primary orifice seal 381 when the supply pressure is high and reduces primary piston oscillations by limiting the flow at low piston strokes. Pressure is communicated from the pilot piston cavity to the primary piston cavity by drilling 371. From this description, it will be understood that a pneumatic coupling is provided between the primary and pilot pistons thereby permitting the construction of a substantially smaller sized solenoid assembly and one of lower cost in comparison to typical solenoid assemblies featuring electromagnetic couplings. As shown in FIG. 9, channel 152 is provided with a venturi 144 to further reduce pressure drop in gases flowing past the primary piston, particularly at high flow rates.

In the "off" position, the pilot return spring 382 forces the pilot piston 306 to seal against the pilot piston orifice 373. Pressure from passageway 266 is then communicated to the back side of the primary piston 379 via the bleed port 375 and equalizes across the primary piston. The primary piston return spring 380 then forces the primary piston to seal against the primary orifice.

In the "on" position, the pilot piston is retracted by the solenoid coil allowing fluid to flow into channel 152 from pilot piston cavity 378. The resulting drop in pressure is communicated to the back side of the primary piston 379 via drilling 371. The resulting pressure differential acting on the primary piston overcomes the return spring force and orifice differential causing the primary piston to open.

If an instant on solenoid assembly is not required or desired for a particular regulator assembly, the pilot piston cavity 378 may be omitted and the primary piston plug 379 can be replaced with a conventional expander plug. In other applications where a high pressure solenoid is not desired, a conventional 2-stage solenoid can be installed in the primary piston cavity with the coil and solenoid housing extending outwardly from the front face 191 of the regulator base.

Figure 10:
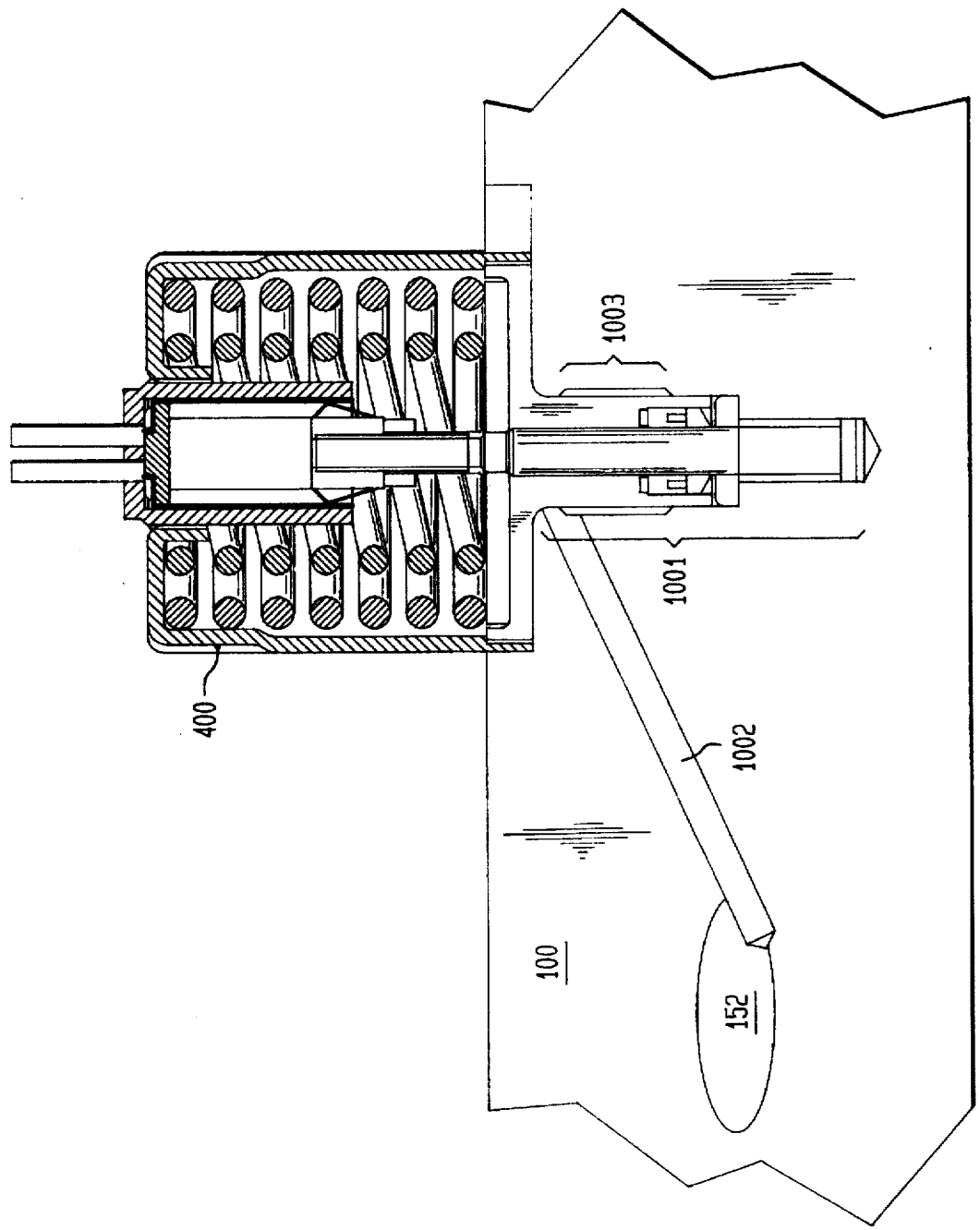
FIG. 10 is a sectional view of the pressure sender assembly.

A high pressure sender (detail not shown) may also be provided to measure feed cylinder pressure, if desired. For example, in some applications, a high pressure sender may not be required as a component of the regulator assembly, particularly where pressure sender means exist next to the high pressure fluid supply cylinder. In the preferred embodiment, a pressure sender assembly 400 is shown in FIG. 10. A high pressure sender port 1001 has been provided in the regulator base 100 to accept the pressure sender assembly. A pressure measurement tap 1002 or channel connects the sender port 1001 to high pressure connector channel 152 downstream of the high pressure solenoid assembly. The small gap between the male threads of the pressure sender 400 and the femal threads of the pressure sender port 1001 form a helical gap along the helical length of the screw threads, forming a distributed orifice 1003, which represents a partial restriction on the fast pressure rise which occurs when the high pressure solenoid opens. This results in less extreme rates of change in the pressure to which the pressure sender is exposed, tending to enhance and prolong its expected working life.

Figure 11:
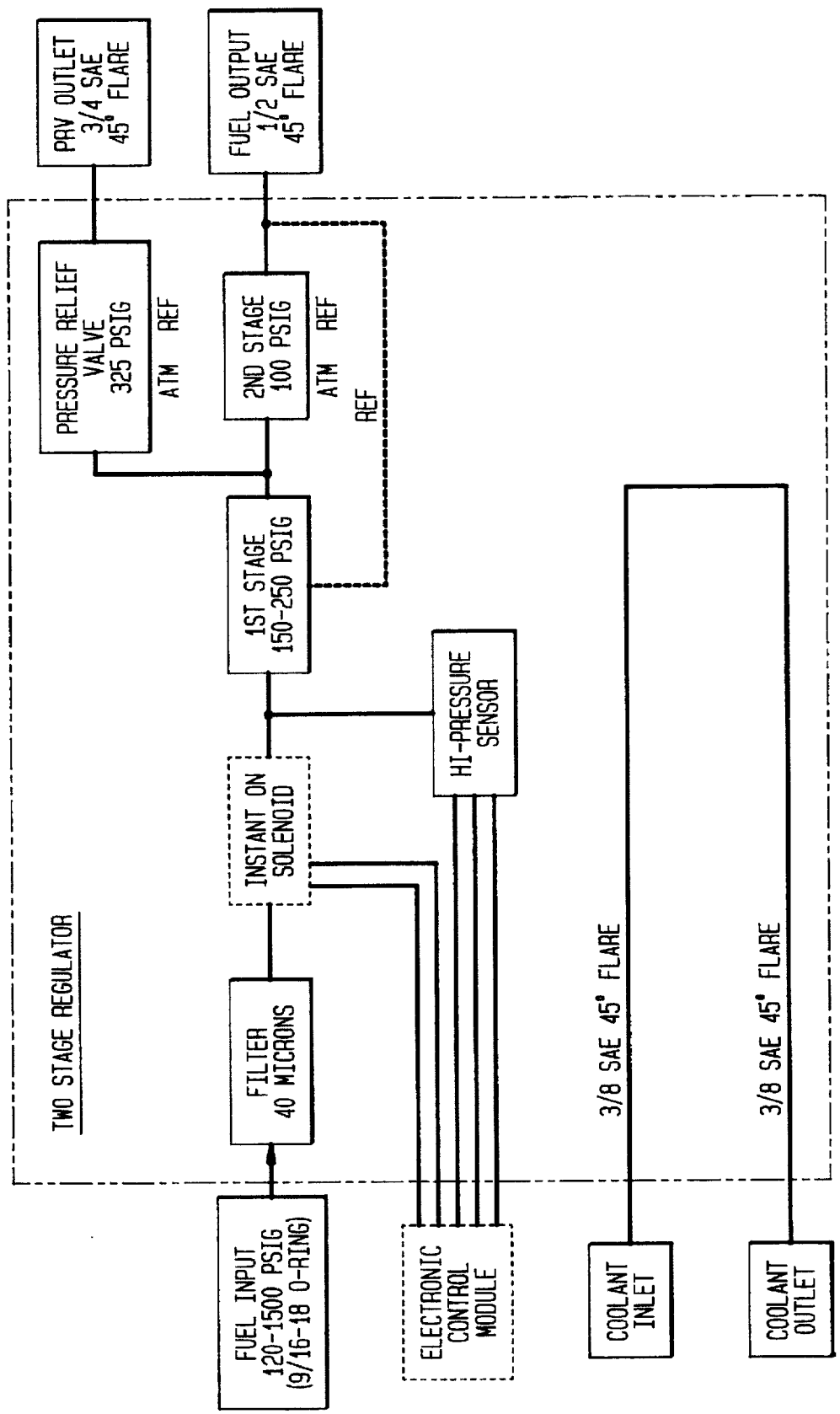
FIG. 11 is a schematic representation of a preferred embodiment of the invention.

FIG. 11 shows a schematic representation of the preferred embodiment of the present invention adapted for use in association with a natural gas supply used to operate a motorized vehicle. In many motor vehicle applications, operating cylinder pressures will typically start at pressures up to 4500 psig. It will be understood by those skilled in the art that embodiments of the present invention may also be adapted to withstand inlet pressures as high as 5,000 psig. In using an embodiment of the present invention, it should in many cases be possible to operate the motor vehicle until cylinder gauge pressure falls to about 120 psig. It is noted that conventional two stage pressure regulators require a minimum of approximately 200 to 450 psig cylinder pressure to continue operation. It can therefore be appreciated that operating ranges can be enhanced by using embodiments of the present invention.

With reference to FIG. 11, a dotted outline encloses the elements of the preferred embodiment. Exterior of the two stage regulator are a fuel input source supplying high pressure fuel to the input filter, an electronic control module used to control the instant on solenoid and high pressure sender and coolant inlet and outlet lines to circulate temperature controlling fluid through the regulator base. Shown on the right of the schematic drawing and exterior of the dotted representation of the regulator are a PRV outlet fitting and a FUEL OUTPUT representing supply of pressure regulated natural gas supply to the vehicle power plant.

As mentioned above, high pressure natural gas flows through a 40 micron filter when the instant on solenoid is in the open position in accordance with signals received from an electronic control module. The pressure of incoming filtered gasses flowing through the solenoid are measured by a high pressure sender located intermediate of the instant on solenoid and the first stage assembly. High pressure gas flows into the first stage of the regulator and exits at between 150 to 250 psig (during normal operating conditions) for supply to the second stage assembly. The pressure relief valve (PRV) is connected to the fluid flow path intermediate of the first and second stages to exhaust overpressurized natural gas flowing from the first stage in excess of a predetermined setting of 325 psig. That is, the PRV will open to exhaust the overpressurized gas in order to protect the second stage components from the effects of excessively high gas pressures. Natural gas exiting from the first stage assembly will flow to the second stage assembly for further pressure regulation resulting in a fuel output flow occuring at a pressure of approximately 100 psig (or other pressure that might be selected and provided for by the spring choices). The schematic representation further illustrates that the operating pressures of the PRV and the second stage pressure regulating assemblies are referenced to atmospheric pressure. However, the operating outlet pressure of the first stage assembly is referenced to the outlet pressure of the second stage assembly during normal operating conditions.

Further useful modifications of the pressure regulator assembly disclosed herein will occur to those skilled in the art and such modifications are intended to be covered by the following claims.

We claim:

1. A two stage pressure regulator assembly comprising:
   a) regulator base comprising a first face and a second face;
   b) a first pressure chamber defined in said base;
   c) a second pressure chamber defined in said base and in pneumatic communication with said first pressure chamber;
   d) inlet means defined in said base adapted to communicate high pressure fluid from an external supply to said first pressure chamber;
   e) outlet means defined in the base adapted to communicate pressure regulated fluid from said second pressure chamber, at least one of said inlet means and said outlet means being defined by said first face;
   f) means adapted to prevent the flow of fluid out of said first pressure chamber at a pressure above a first predetermined level comprising:
      i). first valve seat means provided in said base;
      ii). first valve means adapted to engage with said first valve seat means when said first valve means is in a closed position thereby preventing the flow of fluid through the first pressure chamber;
      iii). first activating means adapted to move said first valve means towards an open position when fluid pressure within the first chamber is below said first predetermined pressure level, and permitting the movement of said first valve means towards a closed position when said fluid pressure is above said first predetermined level, said fist activating means comprising:
         (a) a first diaphragm connected to said first valve means;
         (b) first spring means adapted to act together with said first diaphragm to said first valve means away from a closed position when fluid pressure within said first chamber is below said first predetermined pressure level;
         (c) means for retaining said first spring means in biasing relation with the first diaphragm;
   g) means adapted to prevent the flow of fluid through the second chamber at a pressure above a second predetermined level comprising:
      i) second valve seat means provided in said base;
      ii) second valve means adapted to engage with said second valve seat means when said second valve means is in a closed position, thereby preventing the flow of fluid through the second pressure chamber;
      iii) second activating means adapted to move said second valve means towards an open position when fluid pressure within said second chamber is below said second predetermined pressure level, and permitting the movement of said second valve means towards a closed position when said fluid pressure is above said first predetermined level, the second activating means comprising:
         (a) a second diaphragm connected to said second valve means;
         (b) second spring means adapted to act together with said second diaphragm to bias said second valve means away from a closed position when fluid pressure within said second chamber is below said second predetermined pressure level;
         (c) means for retaining said second spring means in biasing relation with said second diaphragm; and
   h) means adapted to communicate temperature controlling fluid through the base, said temperature control means having inlet and outlet ports, at least one of said inlet and outlet ports being defined by said first face, wherein as least one of said first activating means and said second activating means are substantially positioned on said second face.

2. A two stage regulator assembly as claimed in claim 1 wherein the second spring means comprise third and fourth spring means, and wherein the means adapted to dampen the biasing movement of the third and fourth spring means comprise pressure balancing means, the balancing means comprising a substantially cup-shaped floating member defining a reservoir and adapted to substantially sealably engage with the second valve means, the floating member further defining a channel communicating between the reservoir and the second chamber.

3. A two stage regulator assembly as claimed in claim 2, the floating member being connected to the base.

4. A two stage regulator assembly as claimed in claim 2, the second valve means further comprising sealing means, and the floating member being adapted to engage with the sealing means.

5. A two stage pressure regulator as claimed in claim 4, in which said temperature control inlet and outlet ports and the high pressure fluid inlet means and regulated pressure fluid outlet means are defined by the first face, and wherein the pressure relief means and first and second activating means are substantially positioned on a second face.

6. A two stage pressure regulator assembly comprising:
   a) a regulator base comprising a first face and a second face;
   b) a first pressure chamber provided in said base;
   c) a second pressure chamber provided in said base and in pneumatic communication with said first chamber;
   d) inlet means defined in said base adapted to communicate high pressure fluid from an external supply to said first pressure chamber;
   e) flow control means adapted to permit the flow of high pressure fluid through the regulator assembly when in an open position and adapted to prevent the flow of high pressure fluid through the regulator assembly when said flow control means are in a closed position, said flow control means comprising:
      i) a third chamber defined by said base;
      ii) solenoid activated first plug means adapted to operate between first and second positions;
      iii) second plug means adapted to pneumatically communicate with said first plug means through a first channel and operating between first and second positions, said second plug means being adapted to move to its first operating position upon the first plug means moving to its first position;
      iv) second channel means defined by the first plug and adapted to communicate with the first pressure chamber when the first plug is in the first position and preventing such communication in the second position, said first and second channel means having substantially different diameters;
   f) outlet means defined in the base adapted to communicate pressure regulated fluid from said second pressure chamber, at least one of said inlet means and said outlet means being defined by said first face;
   g) means adapted to prevent the flow of fluid out of said first chamber at a pressure above a first predetermined level comprising:

i) first valve seat means provided in said base;
ii) first valve means adapted to engage with said first valve seat means when said first valve means is in a closed position, thereby preventing the flow of fluid through the first pressure chamber;
iii) first activating means adapted to move said first valve means towards an open position when fluid pressure within the first chamber is below said first predetermined pressure level, and permitting the movement of said first valve means towards a closed position when said fluid pressure is above said first predetermined level, the first activating means comprising:
(a) a first diaphragm connected to said first valve means;
(b) spring means adapted to act together with said first diaphragm to bias said first valve means away from a closed position when fluid pressure within said first chamber is below the first predetermined pressure level;
(c) means adapted to dampen the biasing movement of said spring means;
(d) means for retaining said spring means in biasing relation with said first diaphragm;

h) means adapted to prevent the flow of fluid through said second chamber at a pressure above a second predetermined level comprising:
i) second valve seat means provided in said base;
ii) second valve means adapted to engage with said second valve seat means when said second valve means is in a closed position, thereby preventing the flow of fluid through said second pressure chamber;
iii) second activating means adapted to move said second valve means towards an open position when fluid pressure within said second chamber is above the second predetermined pressure level, and permitting the movement of said second valve means towards a closed position when said fluid pressure is above said first predetermined level, the second activating means comprising:
(a) a second diaphragm connected to said second valve means;
(b) spring means adapted to act together with said second diaphragm to bias said second valve means away from a closed position when fluid pressure within said second chamber is below the second predetermined pressure level;
(c) means adapted to dampen the biasing movement of said spring means;
(d) means for retaining said spring means in biasing relation with the second diaphragm.

7. A two stage pressure regulator as claimed in claim 6 having means for adjusting the setting of the second predetermined pressure level.

8. A two stage pressure regulator assembly comprising:
a) a regulator base comprising a first face and a second face;
b) a first pressure chamber provided in said base;
c) a second pressure chamber provided in said base and in pneumatic communication with said first chamber;
d) inlet means defined in said base adapted to communicate high pressure fluid from an external supply to said first pressure chamber;
e) flow control means adapted to permit the flow of high pressure fluid through the regulator assembly when in an open position and adapted to prevent the flow of high pressure fluid through the regulator assembly when said flow control means are in a closed position, said flow control means comprising:
i) a third chamber defined by said base;
ii) solenoid activated first plug means adapted to operate between first and second positions;
iii) second plug means adapted to pneumatically communicate with said first plug means through a first channel and operating between first and second positions, said second plug means being adapted to move to its first operating position upon the first plug means moving to its first position;
iv) second channel means defined by the first plug and adapted to communicate with the first pressure chamber when the first plug is in the first position and preventing such communication in the second position, said first and second channel means having substantially different diameters;

f) outlet means defined in the base adapted to communicate pressure regulated fluid from said second pressure chamber, at least one of said inlet means and said outlet means being defined by said first face;
g) means adapted to prevent the flow of fluid out of said first chamber at a pressure above a first predetermined level comprising;
i) first valve seat means provided in said base;
ii) first valve means adapted to engage with said first valve seat means when said first valve means is in a closed position, thereby preventing the flow of fluid through the first pressure chamber;
iii) first activating means adapted to move said first valve means towards an open position when fluid pressure within the first chamber is below said first predetermined pressure level, and permitting the movement of said first valve means towards a closed position when said fluid pressure is above said first predetermined level, the first activating means comprising:
(a) a first diaphragm connected to said first valve means;
(b) spring means adapted to act together with said first diaphragm to bias said first valve means away from a closed position when fluid pressure within said first chamber is below the first predetermined pressure level;
(c) means adapted to dampen the biasing movement of said spring means;
(d) means for retaining said spring means in biasing relation with said first diaphragm;

h) means adapted to prevent the flow of fluid through said second chamber at a pressure above a second predetermined level comprising:
i) second valve seat means provided in said base;
ii) second valve means adapted to engage with said second valve seat means when said second valve means is in a closed position, thereby preventing the flow of fluid through said second pressure chamber;
iii) second activating means adapted to move said second valve means towards an open position when fluid pressure within said second chamber is above the second predetermined pressure level, and permitting the movement of said second valve means towards a closed position when said fluid pressure is above said first predetermined level, the second activating means comprising:
(a) a second diaphragm connected to said second valve means;

(b) spring means adapted to act together with said second diaphragm to bias said second valve means away from a closed position when fluid pressure within said second chamber is below the second predetermined pressure level;
(c) means adapted to dampen the biasing movement of said spring means;
(d) means for retaining said spring means in biasing relation with the second diaphragm; and i) pressure relief means communicating with the first pressure chamber and adapted to release high pressure fluid from the assembly if the pressure of the fluid exiting from the first pressure chamber exceeds a preselected value.

9. A two stage pressure regulator as claimed in claim 8 wherein the first and second retaining means are adapted for removable engagement with the base.

10. A two stage pressure regulator as claimed in claim 9 comprising a fluid pressure sender removably attached to the base and communicating with the high pressure fluid inlet means and located intermediate of the flow control means and the first pressure chamber.

11. A two stage pressure regulator as claimed in claim 8, in which the high pressure fluid inlet means and regulated pressure fluid outlet means are defined by the first face, and wherein the pressure relief means and first and second activating means are substantially positioned on a second face.

12. A two stage regulator assembly as claimed in claim 4, further comprising means adapted to communicate temperature controlling fluid through the base, said temperature control means having inlet and outlet ports, at least one of said inlet and outlet ports being defined by said first face.

13. A two stage pressure regulator assembly comprising:
a) a regulator base comprising a first face and a second face;
b) a first pressure chamber provided in said base;
c) a second pressure chamber provided in said base and in pneumatic communication with said first chamber;
d) inlet means defined in said base adapted to communicate high pressure fluid from an external supply to said first pressure chamber;
e) flow control means adapted to permit the flow of high pressure fluid through the regulator assembly when in an open position and adapted to prevent the flow of high pressure fluid through the regulator assembly when said flow control means are in a closed position;
f) outlet means defined in the base adapted to communicate pressure regulated fluid from said second pressure chamber, at least one of said inlet means and said outlet means being defined by said first face;
g) means adapted to prevent the flow of fluid out of said first chamber at a pressure above a first predetermined level comprising:
i) first valve seat means provided in said base;
ii) first valve means adapted to engage with said first valve seat means when said first valve means is in a closed position, thereby preventing the flow of fluid through the first pressure chamber;
iii) first activating means adapted to move said first valve means towards an open position when fluid pressure within the first chamber is below said first predetermined pressure level, and permitting the movement of said first valve means towards a closed position when said fluid pressure is above said first predetermined level, the first activating means comprising:

(a) a first diaphragm connected to said first valve means;
(b) spring means adapted to act together with said first diaphragm to bias said first valve means away from a closed position when fluid pressure within said first chamber is below the first predetermined pressure level;
(c) means adapted to dampen the biasing movement of said spring means;
(d) means for retaining said spring means in biasing relation with said first diaphragm;

h) means adapted to prevent the flow of fluid through said second chamber at a pressure above a second predetermined level comprising:
i) second valve seat means provided in said base;
ii) second valve means adapted to engage with said second valve seat means when said second valve means is in a closed position, thereby preventing the flow of fluid through said second pressure chamber;
iii) second activating means adapted to move said second valve means towards an open position when fluid pressure within said second chamber is above the second predetermined pressure level, and permitting the movement of said second valve means towards a closed position when said fluid pressure is above said first predetermined level, the second activating means comprising:

(a) a second diaphragm connected to said second valve means;
(b) spring means adapted to act together with said second diaphragm to bias said second valve means away from a closed position when fluid pressure within said second chamber is below the second predetermined pressure level;
(c) means adapted to dampen the biasing movement of said spring means;
(d) means for retaining said spring means in biasing relation with the second diaphragm; and i) means adapted to filter impurities from high pressure fluid flowing to the first pressure chamber.

14. A two stage pressure regulator as claimed in claim 13 wherein the first valve seat means define a first orifice and the second valve seat means define a second orifice having an equal or larger diameter relative to the diameter of the first orifice.

15. A two stage pressure regulator as claimed in claim 13 wherein the filter means communicate with the high pressure fluid inlet means and are located intermediate of the high pressure fluid inlet means and the flow control means.

16. A two stage regulator assembly as claimed in claim 13 wherein the filter means comprise a filter housing adapted for removable securement to the regulator base, the housing defining a substantially cylindrical filter chamber, a removable filter element of substantially hollow cylindrical cross section having a first closed end and a second open end and defining a cylindrical surface area, the filter element being adapted for placement within the cylindrical filter chamber to expose substantially all of the cylindrical surface area to high pressure fluid.

17. A two stage regulator assembly as claimed in claim 13 having a cylindrical filter element made of sintered metal containing stainless steel, bronze or brass.

18. A two stage regulator assembly as claimed in claim 13, further comprising means adapted to communicate temperature controlling fluid through the base, said temperature control means having inlet and outlet ports, at least one of said inlet and outlet ports being defined by said first face.

19. A two stage pressure regulator assembly comprising:
a) a regulator base comprising a first face and a second face;
b) a first pressure chamber provided in said base;
c) a second pressure chamber provided in said base and in pneumatic communication with said first chamber;
d) inlet means defined in said base adapted to communicate high pressure fluid from an external supply to said first pressure chamber;
e) flow control means adapted to permit the flow of high pressure fluid through the regulator assembly when in an open position and adapted to prevent the flow of high pressure fluid through the regulator assembly when said flow control means are in a closed position, said flow control means comprising:
  i) a third chamber defined by said base;
  ii) solenoid activated first plug means adapted to operate between first and second positions;
  iii) second plug means adapted to pneumatically communicate with said first plug means through a first channel and operating between first and second positions, said second plug means being adapted to move to its first operating position upon the first plug means moving to its first position;
  iv) second channel means defined by the first plug and adapted to communicate with the first pressure chamber when the first plug is in the first position and preventing such communication in the second position, said first and second channel means having substantially different diameters;
f) outlet means defined in the base adapted to communicate pressure regulated fluid from said second pressure chamber, at least one of said inlet means and said outlet means being defined by said first face;
g) means adapted to prevent the flow of fluid out of said first chamber at a pressure above a first predetermined level comprising:
  i) first valve seat means provided in said base;
  ii) first valve means adapted to engage with said first valve seat means when said first valve means is in a closed position, thereby preventing the flow of fluid through the first pressure chamber;
  iii) first activating means adapted to move said first valve means towards an open position when fluid pressure within the first chamber is below said first predetermined pressure level, and permitting the movement of said first valve means towards a closed position when said fluid pressure is above said first predetermined level, the first activating means comprising:
    (a) a first diaphragm connected to said first valve means;
    (b) spring means adapted to act together with said first diaphragm to bias said first valve means away from a closed position when fluid pressure within said first chamber is below the first predetermined pressure level;
    (c) means adapted to dampen the biasing movement of said spring means;
    (d) means for retaining said spring means in biasing relation with said first diaphragm;
h) means adapted to prevent the flow of fluid through said second chamber at a pressure above a second predetermined level comprising:
  i) second valve seat means provided in said base;
  ii) second valve means adapted to engage with said second valve seat means when said second valve means is in a closed position, thereby preventing the flow of fluid through said second pressure chamber;
  iii) second activating means adapted to move said second valve means towards an open position when fluid pressure within said second chamber is above the second predetermined pressure level, and permitting the movement of said second valve means towards a closed position when said fluid pressure as above said first predetermined level, the second activating means comprising:
    (a) a second diaphragm connected to said valve means;
    (b) spring means adapted to act together with said second diaphragm to bias said second valve means away from a closed position when fluid pressure within said second chamber is below the second predetermined pressure level;
    (c) means adapted to dampen the biasing movement of said spring means;
    (d) means for retaining said spring means in biasing relation with the second diaphragm; and
i) pressure relief means communicating with said first pressure chamber and adapted to release high pressure fluid from the assembly if the pressure of the fluid exiting from said first pressure chamber exceeds a preselected value; and
j) means adapted to filter impurities from high pressure fluid flowing to said first pressure chamber.

20. A two stage pressure regulator as claimed in claim 19 wherein the pressure relief means, filter means, and first and second valve means are adapted for removable engagement with the base.

* * * * *